United States Patent
You et al.

(10) Patent No.: US 10,736,139 B2
(45) Date of Patent: Aug. 4, 2020

(54) UPLINK CONTROL INFORMATION TRANSMISSION METHOD AND APPARATUS

(71) Applicant: HUAWEI TECHNOLOGIES CO., LTD., Shenzhen, Guangdong (CN)

(72) Inventors: Chunhua You, Shanghai (CN); Qufang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/054,300

(22) Filed: Aug. 3, 2018

(65) Prior Publication Data

US 2018/0352575 A1    Dec. 6, 2018

Related U.S. Application Data

(63) Continuation of application No. PCT/CN2016/073705, filed on Feb. 5, 2016.

(51) Int. Cl.
*H04W 74/08* (2009.01)
*H04W 72/12* (2009.01)
(Continued)

(52) U.S. Cl.
CPC ....... *H04W 74/0808* (2013.01); *H04W 16/14* (2013.01); *H04W 72/0413* (2013.01); *H04W 72/12* (2013.01); *H04W 72/14* (2013.01)

(58) Field of Classification Search
None
See application file for complete search history.

(56) References Cited

U.S. PATENT DOCUMENTS

| 2013/0077596 A1 | 3/2013 | Liang et al. |
| 2013/0286993 A1 | 10/2013 | Lee et al. |

(Continued)

FOREIGN PATENT DOCUMENTS

| CN | 101883391 A | 11/2010 |
| CN | 102045861 A | 5/2011 |

(Continued)

OTHER PUBLICATIONS

International Search Report dated Sep. 12, 2016 in corresponding International Patent Application No. PCT/CN2016/073705.
(Continued)

*Primary Examiner* — Ayaz R Sheikh
*Assistant Examiner* — Sori A Aga
(74) *Attorney, Agent, or Firm* — Kilpatrick Townsend & Stockton LLP

(57) ABSTRACT

Embodiments of this application relate to the communications field, and provide an uplink control information transmission method and an apparatus, to effectively ensure that when user equipment has both a PUCCH resource and a PUSCH resource, UCI can be transmitted to a base station. The method includes: pre-configuring, by user equipment, first uplink control information UCI and second UCI, where the first UCI is carried on a PUSCH resource of a first cell for transmission, the second UCI is carried on a PUCCH resource for transmission, and the first cell is a cell on which CCA or LBT detection needs to be performed; and sending, by the user equipment, the first UCI or the second UCI to a base station. The method and the apparatus are used for UCI transmission.

20 Claims, 13 Drawing Sheets

(51) Int. Cl.
*H04W 16/14* (2009.01)
*H04W 72/04* (2009.01)
*H04W 72/14* (2009.01)

(56) References Cited

U.S. PATENT DOCUMENTS

| | | | |
|---|---|---|---|
| 2014/0177572 A1 | 6/2014 | Papasakellariou et al. | |
| 2016/0100406 A1 | 4/2016 | Chen et al. | |
| 2016/0278074 A1* | 9/2016 | Yang | H04L 1/1812 |
| 2018/0027549 A1* | 1/2018 | Wang | H04L 5/0057 370/329 |

FOREIGN PATENT DOCUMENTS

| | | |
|---|---|---|
| CN | 102301792 A | 12/2011 |
| CN | 102377537 A | 3/2012 |
| CN | 103329464 A | 9/2013 |
| CN | 106797654 A | 5/2017 |
| EP | 2392173 B1 | 5/2018 |
| WO | 2016057191 A1 | 4/2016 |
| WO | 2017078826 A1 | 5/2017 |

OTHER PUBLICATIONS

Extended European Search Report for European Application No. 16888836.0 dated Jul. 12, 2018.
ITL: "On the UCI Multiplexing for LAA with DL and UL Transmission"; 3GPP TSG RAN WGI Meeting #80bis, R1-153275; Fukuoka, Japan, May 25-29, 2015; http://www.3gpp.org/ftp/Meetings_3GPP_SYNC/RAN1/Docs/[retrieved on May 24, 2015]; pp. 1-3.
International Search Report, dated Sep. 12, 2016, in International Application No. PCT/CN2016/073705 (6 pp.).
Written Opinion of the International Searching Authority, dated Sep. 12, 2016, in International Application No. PCT/CN2016/073705 (8 pp.).
Itl,"On the UCI multiplexing for LAA with DL and UL transmission", 3GPP TSG RAN WG1 Meeting #80bis R1-153275, Fukuoka, Japan, May 25-29, 2015, total 3 pages.
Alcatel-Lucent et al.,"Control Signaling for Laa",3GPP TSG RAN WG1 Meeting #80bis R1-151484,Belgrade, Serbia, Apr. 20-24, 2015, total 4 pages.
Nokia Networks,"On the PHY options for LAA UL operation",3GPP TSG-RAN WG1 Meeting #80bis R1-151841, Belgrade, Serbia, Apr. 20-24, 2015, total 5 pages.

\* cited by examiner

UPLINK CONTROL INFORMATION TRANSMISSION METHOD AND APPARATUS

CROSS-REFERENCE TO RELATED APPLICATIONS

This application is a continuation of International Application No. PCT/CN2016/073705, filed on Feb. 5, 2016, the disclosure of which is hereby incorporated by reference in its entirety.

TECHNICAL FIELD

This application relates to the communications field, and in particular, to an uplink control information transmission method and an apparatus.

BACKGROUND

Currently, due to condition limitations such as radio frequency links of some types of user equipments (English full name: user equipment, UE for short), the UEs of these types cannot simultaneously transmit a physical uplink control channel (English full name: physical uplink control channel, PUCCH for short) and a physical uplink shared channel (English full name: physical uplink shared channel, PUSCH for short).

In the prior art, when such UE has both a PUCCH resource and a PUSCH resource, uplink control information (English full name: uplink control information, UCI for short) is carried on the PUSCH resource for transmission, and UCI does not need to be transmitted on the PUCCH resource. Based on a cell index (English full name: cell index), the UCI may be carried on a PUSCH resource of a cell with a minimum cell index, to avoid simultaneous transmission of PUCCH data and PUSCH data. For example, as shown in FIG. 1, in a subframe, a serving cell (English full name: serving cell) 1 and a serving cell 2 each have a PUSCH resource allocated by a base station. In this case, if UCI needs to be transmitted, the UCI is carried for transmission on a resource of the serving cell 1 based on a cell index.

It should be noted that a PUCCH resource may be in a licensed spectrum cell, for example, a primary serving cell (English full name: primary cell, Pcell for short) in a carrier aggregation cell. The carrier aggregation cell includes a licensed spectrum cell and an unlicensed spectrum cell, and the unlicensed spectrum cell uses an unlicensed spectrum. The unlicensed spectrum cell may be a licensed-assisted access (English full name: license-assisted access, LAA for short) cell, and the LAA cell can transmit a PUCCH resource and a PUSCH resource only when the LAA cell and the licensed spectrum cell perform carrier aggregation (English full name: carrier aggregation, CA for short).

A PUCCH may also be in a standalone licensed-assisted access LAA (standalone LAA) cell and can work independently without relying on the licensed spectrum cell. In other words, the unlicensed spectrum cell may also have a PUCCH resource.

However, in the unlicensed spectrum cell, before a base station (English full name: eNodeB, eNB for short) sends downlink data or UE sends uplink data, a channel access process such as a listen before talk (English full name: listen before talk, LBT for short) process needs to be completed. If the LBT succeeds, UCI is successfully sent; otherwise, UCI cannot be sent. As shown in FIG. 2, UCI is carried on a PUSCH resource of an LAA cell, but because LBT fails, the UCI cannot be transmitted to an eNB in time, consequently affecting uplink scheduling.

SUMMARY

The present invention provides an uplink control information transmission method and an apparatus, to effectively ensure that when user equipment has both a PUCCH resource and a PUSCH resource, UCI can be transmitted to a base station.

The foregoing objective and another objective are achieved based on characteristics in the independent claims. Further implementations are provided in the dependent claims, the specification, and the accompanying drawings.

According to a first aspect, an uplink control information transmission method is provided, including:

pre-configuring, by user equipment, first uplink control information UCI and second UCI, where the first UCI is carried on a physical uplink shared channel PUSCH resource of a first cell for transmission, the second UCI is carried on a physical uplink control channel PUCCH resource for transmission, and the first cell is a cell on which clear channel assessment CCA or listen before talk LBT detection needs to be performed; and sending, by the user equipment, the first UCI or the second UCI to a base station.

According to the uplink control information transmission method provided in the first aspect, the user equipment pre-configures the first UCI and the second UCI, adds the first UCI to the physical uplink shared channel PUSCH resource of the first cell for transmission, adds the second UCI to the physical uplink control channel PUCCH resource for transmission, and sends the first UCI or the second UCI to the base station, to effectively ensure that when the user equipment has both a PUCCH resource and a PUSCH resource, the UCI can be transmitted to the base station.

In a first implementation of the first aspect, before the sending, by the user equipment, the first UCI or the second UCI to a base station, the method further includes:

performing, by the user equipment, CCA or LBT on the first cell.

With reference to the first implementation of the first aspect, in a second implementation of the first aspect, the sending, by the user equipment, the first UCI or the second UCI to a base station includes:

if it is detected that the first cell is not idle, transmitting, by the user equipment, the UCI on the PUCCH resource; or
if it is detected that the first cell is idle, transmitting, by the user equipment, the UCI on the PUSCH resource of the first cell.

According to a second aspect, an uplink control information transmission method is provided and applied to user equipment. When the user equipment has both a physical uplink control channel PUCCH resource and a physical uplink shared channel PUSCH resource in a current subframe, the method includes:

transmitting, by the user equipment, uplink control information UCI based on a cell type of a cell in which the PUSCH resource is located, where the cell type of the cell in which the PUSCH resource is located includes a first cell and a second cell, or the cell type of the cell in which the PUSCH resource is located includes only a first cell, the first cell is a cell on which clear channel assessment CCA or listen before talk LBT detection needs to be performed, and the second cell is a cell on which CCA or LBT detection does not need to be performed.

According to the uplink control information transmission method provided in the second aspect, the user equipment has both a PUSCH resource of the first cell and a PUSCH resource of the second cell, and the user equipment may transmit the UCI based on the cell type of the cell in which the PUSCH resource is located, to effectively ensure that when the user equipment has both the PUCCH resource and the PUSCH resource, the UCI can be transmitted to a base station and the base station receives the UCI.

Specifically, there are the following two implementations for transmitting, by the user equipment, the uplink control information UCI based on the cell type of the cell in which the PUSCH resource is located.

In a first implementation of the second aspect, before the transmitting, by the user equipment, UCI based on a cell type of a cell in which the PUSCH resource is located, the method further includes:

receiving, by the user equipment, first configuration information sent by a base station, where the first configuration information includes a cell index of the first cell and a cell index of the second cell, and the cell index of the first cell is greater than the cell index of the second cell; or the first configuration information includes only a cell index of the first cell.

With reference to the first implementation of the second aspect, in a second implementation of the second aspect, the transmitting, by the user equipment, UCI based on a cell type of a cell in which the PUSCH resource is located includes:

when the cell type of the cell in which the PUSCH resource is located includes a first cell and at least one second cell, transmitting, by the user equipment, the UCI by adding the UCI to a PUSCH resource of a second cell with a minimum cell index.

With reference to the second aspect, in a third implementation of the second aspect, the transmitting, by the user equipment, UCI based on a cell type of a cell in which the PUSCH resource is located includes:

when the cell type of the cell in which the PUSCH resource is located includes only a first cell, skipping sending, by the user equipment, the UCI, or transmitting the UCI on the PUCCH resource.

According to a third aspect, an uplink control information transmission method is provided and applied to user equipment. When the user equipment has both a physical uplink control channel PUCCH resource and a physical uplink shared channel PUSCH resource in a subframe K, the method includes:

adding, by the user equipment, UCI to a PUSCH resource of a first cell in at least one subframe after the subframe K, where the first cell is a cell on which clear channel assessment CCA or listen before talk LBT detection needs to be performed; and transmitting, by the user equipment, the UCI on the PUSCH resource.

According to the uplink control information transmission method provided in the third aspect, after adding the UCI to the PUSCH resource of the first cell, the user equipment transmits the UCI on the PUSCH resource in the at least one subframe after the subframe K, to effectively ensure that when the user equipment has both the PUCCH resource and the PUSCH resource, the UCI can be transmitted to a base station and the base station receives the UCI.

In a first implementation of the third aspect, a cell type of a cell in which the PUCCH resource is located includes a first cell or a second cell, the second cell is a cell on which clear channel assessment CCA or listen before talk LBT detection does not need to be performed, and when the cell type of the cell in which the PUCCH resource is located is a first cell, duration occupied by the PUCCH resource is less than or equal to duration of a subframe.

In a second implementation of the third aspect, when a cell type of a cell in which the PUCCH resource is located is a first cell, the PUCCH includes a PUCCH that is distributed over an entire bandwidth or most contiguous or non-contiguous bandwidths, and the adding, by the user equipment, UCI to a PUSCH resource of a first cell in at least one subframe after the subframe K includes:

adding, by the user equipment, the UCI to the PUSCH resource of the first cell based on a cell index of the first cell.

With reference to the second implementation of the third aspect, in a third implementation of the third aspect, before the transmitting, by the user equipment, the UCI on the PUSCH resource, the method further includes:

performing, by the user equipment, CCA or LBT on the first cell.

With reference to the third implementation of the third aspect, in a fourth implementation of the third aspect, the transmitting, by the user equipment, the UCI on the PUSCH resource includes:

if it is detected that the first cell is idle, transmitting, by the user equipment, the UCI on the PUSCH resource in the at least one subframe after the subframe K; and if it is detected that the first cell is not idle, continuing, by the user equipment, to perform CCA or LBT on the first cell.

With reference to the fourth implementation of the third aspect, in a fifth implementation of the third aspect, after the continuing to perform CCA or LBT on the first cell, the method further includes:

if it is detected that the first cell is idle, transmitting, by the user equipment, the UCI on a PUSCH resource in at least one subframe after a subframe K+1.

According to a fourth aspect, an uplink control information transmission method is provided and applied to user equipment. When the user equipment simultaneously transmits a physical uplink control channel PUCCH and a physical uplink shared channel PUSCH in a subframe K, the method includes:

receiving, by the user equipment, first configuration information sent by a base station, where the first configuration information includes: physical uplink control channel PUCCH resource location information and at least one of a PUCCH timer Timer, a transmission opportunity TXOP, uplink resource duration allocated by the base station, and a PUCCH location at which channel state information CSI is located, and the PUCCH resource location information includes at least two candidate locations of a PUCCH resource;

performing, by the user equipment, listen before talk LBT based on the first configuration information, to obtain an LBT result; and determining, by the user equipment, a location of the PUCCH resource in a subframe based on the LBT result.

According to the uplink control information transmission method provided in the fourth aspect, the user equipment performs LBT by using the first configuration information, and determines a location of the PUCCH resource in a subframe based on the LBT result, to effectively ensure that when the user equipment has both a PUCCH resource and a PUSCH resource, the UCI can be transmitted to the base station as soon as possible and the base station receives the UCI.

According to a fifth aspect, an uplink control information transmission method is provided and applied to user equipment. When the user equipment simultaneously transmits a physical uplink control channel PUCCH and a physical uplink shared channel PUSCH in a subframe K, the method includes:

adding, by the user equipment, UCI to a physical uplink shared channel PUSCH resource of a first cell for transmission;

performing, by the user equipment, clear channel assessment CCA or listen before talk LBT on the first cell; and if it is detected that the first cell is not idle, transmitting, by the user equipment, the UCI by adding the UCI to a PUSCH resource of a serving cell, where the serving cell includes a first cell and/or a second cell, the first cell is a cell on which CCA or LBT detection needs to be performed, and the UCI does not include a hybrid automatic repeat request HARQ feedback; or if it is detected that the first cell is idle, transmitting, by the user equipment, the UCI on the PUSCH resource of the first cell.

In this way, the UE adds the UCI to the PUSCH resource of the first cell. When the UE detects that the first cell is idle, the UE transmits the UCI on the PUSCH resource of the first cell; or when the UE detects that the first cell is not idle, the UE transmits the UCI by adding the UCI to the PUSCH resource of the serving cell, to effectively ensure that when the user equipment has both a PUCCH resource and a PUSCH resource, the UCI can be transmitted to a base station.

According to a sixth aspect, an uplink control information transmission method is provided and applied to user equipment. When the user equipment simultaneously transmits a physical uplink control channel PUCCH and a physical uplink shared channel PUSCH in a subframe K, the method includes:

receiving, by the user equipment, first configuration information sent by a base station, where the first configuration information includes: an LBT priority class, a defer period defer period, and a backoff time window CWS;

adding, by the user equipment, UCI to a PUSCH resource of a first cell, where the first cell is a cell on which CCA or LBT detection needs to be performed;

adjusting, by the user equipment, an LBT parameter, for example, reduce an LBT priority class, shorten a defer period, or reduce a CWS window, so as to preempt a channel resource more quickly by using the LBT; and performing, by the user equipment, LBT on the first cell based on the adjusted LBT parameter, and when detecting that the first cell is idle, transmitting, by the UE, the UCI on the PUSCH resource of the first cell.

In this way, the user equipment preempts a channel resource more quickly based on the LBT, to effectively ensure that the UCI can be transmitted to the base station when the user equipment has both a PUCCH resource and a PUSCH resource.

According to a seventh aspect, an uplink control information transmission method is provided, including:

receiving, by UE, window configuration information sent by a base station;

if the UE fails to send a PUCCH in a current window, transmitting, in at least one next window of the current window, UCI by adding the UCI to a PUSCH resource.

In this way, if no channel resource has been preempted at all in a transmission opportunity TXOP window, the UCI is carried on the PUSCH resource for transmission in a next TXOP window even if there is no PUCCH resource, to effectively ensure that the UCI can be transmitted to the base station.

According to an eighth aspect, user equipment is provided, including:

a processing unit, configured to pre-configure first uplink control information UCI and second UCI, where the first UCI is carried on a physical uplink shared channel PUSCH resource of a first cell for transmission, the second UCI is carried on a physical uplink control channel PUCCH resource for transmission, and the first cell is a cell on which clear channel assessment CCA or listen before talk LBT detection needs to be performed; and a sending unit, configured to send the first UCI or the second UCI to a base station.

The user equipment provided in the eighth aspect pre-configures the first UCI and the second UCI, adds the first UCI to the physical uplink shared channel PUSCH resource of the first cell for transmission, adds the second UCI to the physical uplink control channel PUCCH resource for transmission, and sends the first UCI or the second UCI to the base station, to effectively ensure that when the user equipment has both a PUCCH resource and a PUSCH resource, the UCI can be transmitted to the base station.

In a first implementation of the eighth aspect, the processing unit is further configured to:

perform CCA or LBT on the first cell.

With reference to the first implementation of the eighth aspect, in a second implementation of the eighth aspect, the sending unit is specifically configured to:

if it is detected that the first cell is not idle, transmit the UCI on the PUCCH resource; or if it is detected that the first cell is idle, transmit the UCI on the PUSCH resource of the first cell.

According to a ninth aspect, user equipment is provided. When the user equipment has both a physical uplink control channel PUCCH resource and a physical uplink shared channel PUSCH resource in a current subframe, the user equipment includes:

a sending unit, configured to transmit uplink control information UCI based on a cell type of a cell in which the PUSCH resource is located, where the cell type of the cell in which the PUSCH resource is located includes a first cell and a second cell, or the cell type of the cell in which the PUSCH resource is located includes only a first cell, the first cell is a cell on which clear channel assessment CCA or listen before talk LBT detection needs to be performed, and the second cell is a cell on which CCA or LBT detection does not need to be performed.

The user equipment provided in the ninth aspect has both a PUSCH resource of the first cell and a PUSCH resource of the second cell, and the user equipment may transmit the UCI based on the cell type of the cell in which the PUSCH resource is located, to effectively ensure that when the user equipment has both the PUCCH resource and the PUSCH resource, the UCI can be transmitted to a base station and the base station receives the UCI.

Specifically, there are the following two implementations for transmitting, by the user equipment, the uplink control information UCI based on the cell type of the cell in which the PUSCH resource is located.

In a first implementation of the ninth aspect, the user equipment further includes:

a receiving unit, configured to receive first configuration information sent by a base station, where the first configuration information includes a cell index of the first cell and a cell index of the second cell, and the cell index of the first cell is greater than the cell index of the second cell; or the first configuration information includes only a cell index of the first cell.

With reference to the first implementation of the ninth aspect, in a second implementation of the ninth aspect, the sending unit is specifically configured to:

when the cell type of the cell in which the PUSCH resource is located includes a first cell and at least one second cell, transmit the UCI after the UCI is added to a PUSCH resource of a second cell with a minimum cell index.

With reference to the ninth aspect, in a third implementation of the ninth aspect, the sending unit is specifically configured to:

when the cell type of the cell in which the PUSCH resource is located includes only a first cell, skip sending the UCI, or transmit the UCI on the PUCCH resource.

According to a tenth aspect, user equipment is provided. When the user equipment has both a physical uplink control channel PUCCH resource and a physical uplink shared channel PUSCH resource in a subframe K, the user equipment includes:

a processing unit, configured to add UCI to a PUSCH resource of a first cell in at least one subframe after the subframe K, where the first cell is a cell on which clear channel assessment CCA or listen before talk LBT detection needs to be performed; and a sending unit, configured to transmit the UCI on the PUSCH resource.

After adding the UCI to the PUSCH resource of the first cell, the user equipment provided in the tenth aspect transmits the UCI on the PUSCH resource in the at least one subframe after the subframe K, to effectively ensure that when the user equipment has both the PUCCH resource and the PUSCH resource, the UCI can be transmitted to a base station and the base station receives the UCI.

In a first implementation of the tenth aspect, a cell type of a cell in which the PUCCH resource is located includes a first cell or a second cell, the second cell is a cell on which clear channel assessment CCA or listen before talk LBT detection does not need to be performed, and when the cell type of the cell in which the PUCCH resource is located is a first cell, duration occupied by the PUCCH resource is less than or equal to duration of a subframe.

In a second implementation of the tenth aspect, when a cell type of a cell in which the PUCCH resource is located is a first cell, the PUCCH includes a PUCCH that is distributed over an entire bandwidth or most contiguous or non-contiguous bandwidths, and the processing unit is specifically configured to:

add the UCI to the PUSCH resource of the first cell based on a cell index of the first cell.

With reference to the second implementation of the tenth aspect, in a third implementation of the tenth aspect, the processing unit is further configured to:

perform CCA or LBT on the first cell.

With reference to the third implementation of the tenth aspect, in a fourth implementation of the tenth aspect, the sending unit is specifically configured to:

if it is detected that the first cell is idle, transmit the UCI on the PUSCH resource in the at least one subframe after the subframe K; and the processing unit is further configured to:

if it is detected that the first cell is not idle, continue to perform CCA or LBT on the first cell.

With reference to the fourth implementation of the tenth aspect, in a fifth implementation of the tenth aspect, the sending unit is further configured to:

if the user equipment detects that the first cell is idle, transmit the UCI on a PUSCH resource in at least one subframe after a subframe K+1.

According to an eleventh aspect, user equipment is provided. When the user equipment simultaneously transmits a physical uplink control channel PUCCH and a physical uplink shared channel PUSCH in a subframe K, the user equipment includes:

a receiving unit, configured to receive first configuration information sent by a base station, where the first configuration information includes: physical uplink control channel PUCCH resource location information and at least one of a PUCCH timer Timer, a transmission opportunity TXOP, uplink resource duration allocated by the base station, and a PUCCH location at which channel state information CSI is located, and the PUCCH resource location information includes at least two candidate locations of a PUCCH resource; and a processing unit, configured to perform listen before talk LBT based on the first configuration information, to obtain an LBT result, where the processing unit is further configured to determine a location of the PUCCH resource in a subframe based on the LBT result.

The user equipment provided in the eleventh aspect performs LBT by using the first configuration information, and determines a location of the PUCCH resource in a subframe based on the LBT result, to effectively ensure that when the user equipment has both a PUCCH resource and a PUSCH resource, the UCI can be transmitted to the base station as soon as possible and the base station receives the UCI.

According to a twelfth aspect, user equipment is provided, including:

a processor, configured to pre-configure first uplink control information UCI and second UCI, where the first UCI is carried on a physical uplink shared channel PUSCH resource of a first cell for transmission, the second UCI is carried on a physical uplink control channel PUCCH resource for transmission, and the first cell is a cell on which clear channel assessment CCA or listen before talk LBT detection needs to be performed; and a transmitter, configured to send the first UCI or the second UCI to a base station.

The user equipment provided in the twelfth aspect pre-configures the first UCI and the second UCI, adds the first UCI to the physical uplink shared channel PUSCH resource of the first cell for transmission, adds the second UCI to the physical uplink control channel PUCCH resource for transmission, and sends the first UCI or the second UCI to the base station, to effectively ensure that when the user equipment has both a PUCCH resource and a PUSCH resource, the UCI can be transmitted to the base station.

In a first implementation of the twelfth aspect, the processor is further configured to:

perform CCA or LBT on the first cell.

With reference to the first implementation of the twelfth aspect, in a second implementation of the twelfth aspect, the transmitter is specifically configured to:

if it is detected that the first cell is not idle, transmit the UCI on the PUCCH resource; or if it is detected that the first cell is idle, transmit the UCI on the PUSCH resource of the first cell.

According to a thirteenth aspect, user equipment is provided. When the user equipment has both a physical uplink control channel PUCCH resource and a physical uplink shared channel PUSCH resource in a current subframe, the user equipment includes:

a transmitter, configured to transmit uplink control information UCI based on a cell type of a cell in which the PUSCH resource is located, where the cell type of the cell in which the PUSCH resource is located includes a first cell and a second cell, or the cell type of the cell in which the PUSCH resource is located includes only a first cell, the first cell is a cell on which clear channel assessment CCA or listen before talk LBT detection needs to be performed, and the second cell is a cell on which CCA or LBT detection does not need to be performed.

The user equipment provided in the thirteenth aspect has both a PUSCH resource of the first cell and a PUSCH resource of the second cell, and the user equipment may transmit the UCI based on the cell type of the cell in which the PUSCH resource is located, to effectively ensure that when the user equipment has both the PUCCH resource and the PUSCH resource, the UCI can be transmitted to a base station and the base station receives the UCI.

Specifically, there are the following two implementations for transmitting, by the user equipment, the uplink control information UCI based on the cell type of the cell in which the PUSCH resource is located.

In a first implementation of the thirteenth aspect, the user equipment further includes:

a receiver, configured to receive first configuration information sent by a base station, where the first configuration information includes a cell index of the first cell and a cell index of the second cell, and the cell index of the first cell is greater than the cell index of the second cell; or the first configuration information includes only a cell index of the first cell.

With reference to the first implementation of the thirteenth aspect, in a second implementation of the thirteenth aspect, the transmitter is specifically configured to:

when the cell type of the cell in which the PUSCH resource is located includes a first cell and at least one second cell, transmit the UCI after the UCI is added to a PUSCH resource of a second cell with a minimum cell index.

With reference to the thirteenth aspect, in a third implementation of the thirteenth aspect, the transmitter is specifically configured to:

when the cell type of the cell in which the PUSCH resource is located includes only a first cell, skip sending the UCI, or transmit the UCI on the PUCCH resource.

According to a fourteenth aspect, user equipment is provided. When the user equipment has both a physical uplink control channel PUCCH resource and a physical uplink shared channel PUSCH resource in a subframe K, the user equipment includes:

a processor, configured to add UCI to a PUSCH resource of a first cell in at least one subframe after the subframe K, where the first cell is a cell on which clear channel assessment CCA or listen before talk LBT detection needs to be performed; and a transmitter, configured to transmit the UCI on the PUSCH resource.

After adding the UCI to the PUSCH resource of the first cell, the user equipment provided in the fourteenth aspect transmits the UCI on the PUSCH resource in the at least one subframe after the subframe K, to effectively ensure that when the user equipment has both the PUCCH resource and the PUSCH resource, the UCI can be transmitted to a base station and the base station receives the UCI.

In a first implementation of the fourteenth aspect, a cell type of a cell in which the PUCCH resource is located includes a first cell or a second cell, the second cell is a cell on which clear channel assessment CCA or listen before talk LBT detection does not need to be performed, and when the cell type of the cell in which the PUCCH resource is located is a first cell, duration occupied by the PUCCH resource is less than or equal to duration of a subframe.

In a second implementation of the fourteenth aspect, when a cell type of a cell in which the PUCCH resource is located is a first cell, the PUCCH includes a PUCCH that is distributed over an entire bandwidth or most contiguous or non-contiguous bandwidths, and the processor is specifically configured to:

add the UCI to the PUSCH resource of the first cell based on a cell index of the first cell.

With reference to the second implementation of the fourteenth aspect, in a third implementation of the fourteenth aspect, the processor is further configured to:

perform CCA or LBT on the first cell.

With reference to the third implementation of the fourteenth aspect, in a fourth implementation of the fourteenth aspect, the transmitter is specifically configured to:

if it is detected that the first cell is idle, transmit the UCI on the PUSCH resource in the at least one subframe after the subframe K; and the processor is further configured to:

if it is detected that the first cell is not idle, continue to perform CCA or LBT on the first cell.

With reference to the fourth implementation of the fourteenth aspect, in a fifth implementation of the fourteenth aspect, the transmitter is further configured to:

if the user equipment detects that the first cell is idle, transmit the UCI on a PUSCH resource in at least one subframe after a subframe K+1.

According to a fifteenth aspect, user equipment is provided. When the user equipment simultaneously transmits a physical uplink control channel PUCCH and a physical uplink shared channel PUSCH in a subframe K, the user equipment includes:

a receiver, configured to receive first configuration information sent by a base station, where the first configuration information includes: physical uplink control channel PUCCH resource location information and at least one of a PUCCH timer Timer, a transmission opportunity TXOP, uplink resource duration allocated by the base station, and a PUCCH location at which channel state information CSI is located, and the PUCCH resource location information includes at least two candidate locations of a PUCCH resource; and a processor, configured to perform listen before talk LBT based on the first configuration information, to obtain an LBT result, where the processor is further configured to determine a location of the PUCCH resource in a subframe based on the LBT result.

The user equipment provided in the fifteenth aspect performs LBT by using the first configuration information, and determines a location of the PUCCH resource in a subframe based on the LBT result, to effectively ensure that when the user equipment has both a PUCCH resource and a PUSCH resource, the UCI can be transmitted to the base station as soon as possible and the base station receives the UCI.

In the present invention, a name of the user equipment does not constitute a limitation on devices themselves. In actual implementation, these devices may have other names.

Provided that a function of each device is similar to that in the present invention, the device falls within the scope of the claims of the present invention and their equivalent technologies.

These aspects or other aspects of the present invention are more concise and understandable in the description of the following embodiments.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
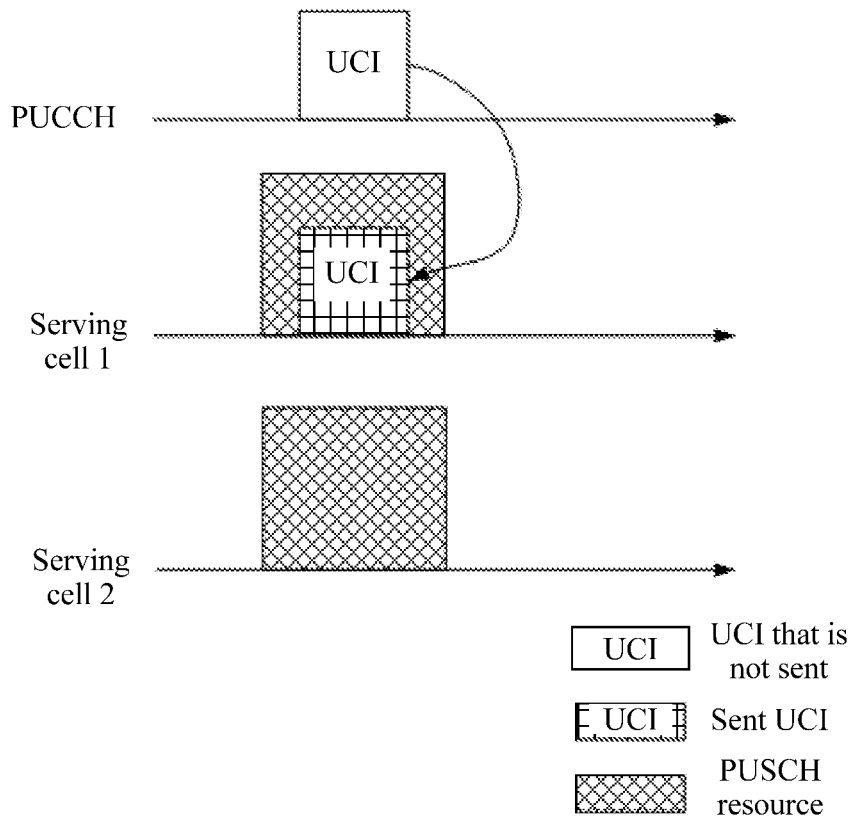
FIG. 1 is a schematic diagram of uplink control information transmission according to the prior art.
Figure 2:
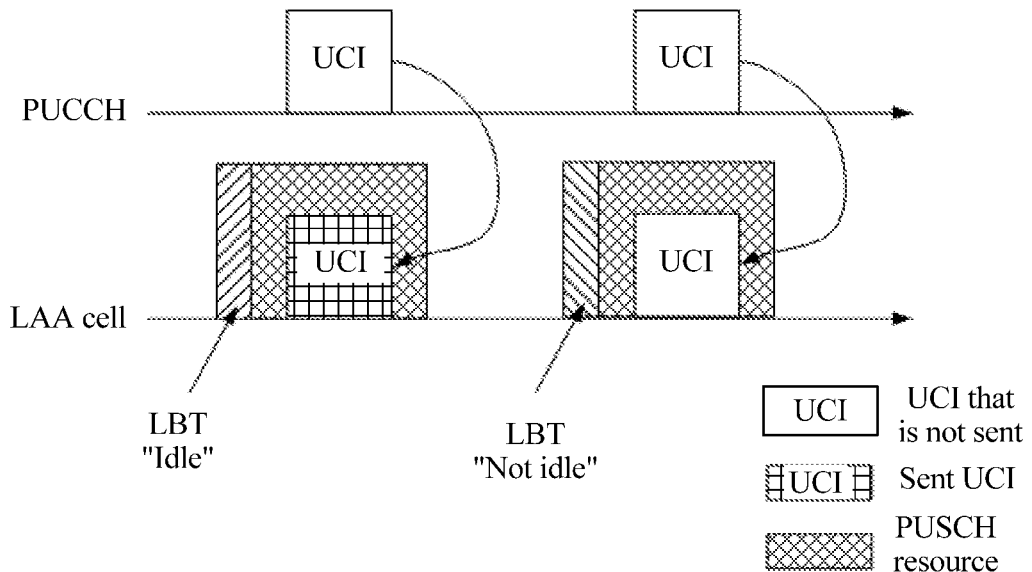
FIG. 2 is another schematic diagram of uplink control information transmission according to the prior art.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The present invention is mainly applied to a cell on which clear channel assessment CCA or listen before talk LBT detection needs to be performed. The cell on which clear channel assessment CCA or listen before talk LBT detection needs to be performed may be a licensed spectrum cell or an unlicensed spectrum cell. Certainly, the present invention may also be applied to a normal time interval (English full name: Transmission Time Interval, TTI for short) system, a short TTI system, or a mixed TTI system.

A terminal device in the embodiments of the present invention may be a device that provides a user with voice and/or data connectivity, a handheld device with a wireless connection function, or another processing device connected to a wireless modem. A wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus that exchanges voice and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The embodiments of the present invention relate to a base station, and the base station may be configured to mutually convert a received over-the-air frame and an IP packet and serves as a router between the wireless terminal and a remaining part of the access network, where the remaining part of the access network may include an Internet Protocol (IP) network. The base station may further coordinate attribute management of an air interface. For example, the base station may be a base transceiver station (BTS, Base Transceiver Station) in GSM or CDMA, or may be a NodeB (NodeB) in WCDMA, or may be an evolved NodeB (eNB or e-NodeB, evolutional NodeB) in LTE. This is not limited in this application.

A basic principle of the present invention is as follows: When user equipment (English full name: user equipment, UE for short) has both a PUCCH resource and a PUSCH resource in a current subframe, the user equipment prepares two pieces of uplink control information (English full name: uplink control information, UCI for short) in advance. One piece of UCI is carried on the PUCCH resource, and the other piece of UCI is carried on a PUSCH resource of a first cell. If it is detected that the first cell is not idle, the user equipment transmits the UCI on the PUCCH resource; or if it is detected that the first cell is idle, the user equipment transmits the UCI on the PUSCH resource of the first cell. Alternatively, the user equipment transmits the UCI based on a cell type of a cell in which the PUSCH resource is located. Alternatively, the UE adds the UCI to a PUSCH resource of a first cell in at least one subframe after a subframe K and transmits the UCI. Therefore, it can be effectively ensured that the UCI can be transmitted to a base station (English full name: eNodeB, eNB for short).

The implementations of the present invention are described in detail below with reference to the accompanying drawings.

Embodiment 1

Figure 3:
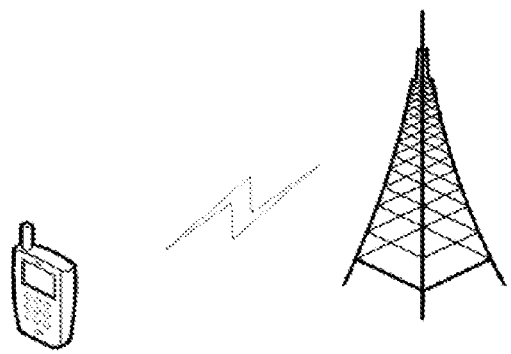
FIG. 3 is a schematic diagram of a communications system according to an embodiment of the present invention.

This embodiment of the present invention provides a schematic diagram of a communications system. As shown in FIG. 3, the communications system includes user equipment (English full name: user equipment, UE for short) and a base station (English full name: eNodeB, eNB for short). The UE and the eNB communicate with each other by using a wireless signal.

Figure 4:
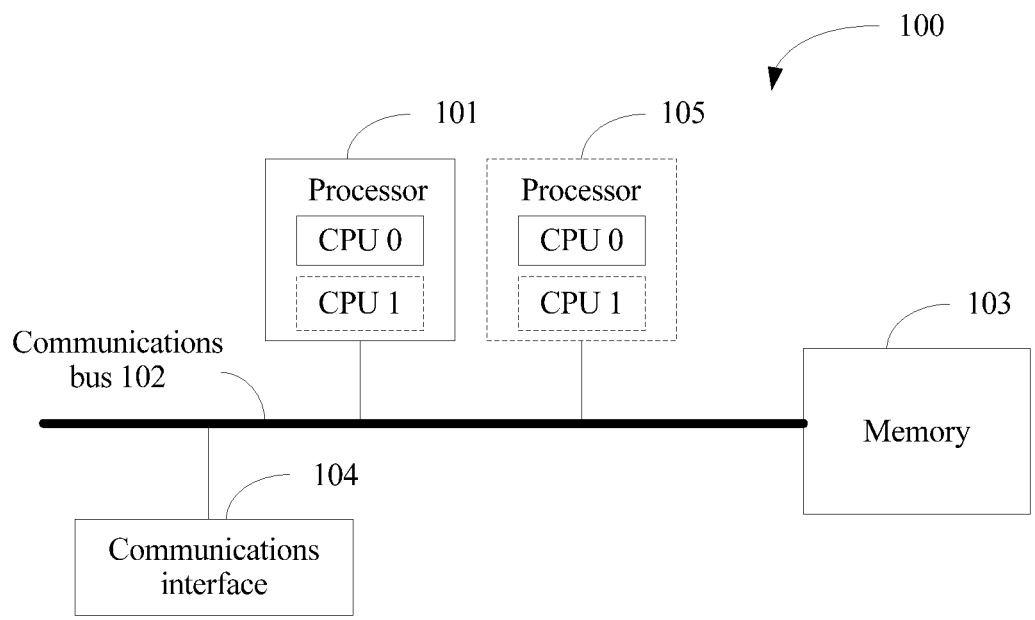
FIG. 4 is a schematic structural diagram of a computer device according to an embodiment of the present invention.

As shown in FIG. 4, the user equipment and the base station in FIG. 3 may be implemented by using a computer device (or a system) in FIG. 4.

FIG. 4 is a schematic diagram of the computer device according to an embodiment of the present invention. The computer device 100 includes at least one processor 101, a communications bus 102, a memory 103, and at least one communications interface 104.

The processor 101 may be one processor, or may be a general name of a plurality of processing elements. For example, the processor 101 may be a general-purpose central processing unit (English full name: Central Processing Unit, CPU for short), or may be an application-specific integrated circuit (English full name: application-specific integrated circuit, ASIC for short), or one or more integrated circuits configured to control program execution of the solution in the present invention, for example, one or more microprocessors (microcontroller, MCU for short), or one or more field programmable gate arrays (English full name: Field Programmable Gate Array, FPGA for short).

In specific implementation, in an embodiment, the processor 101 may include one or more CPUs such as a CPU 0 and a CPU 1 in FIG. 4.

In specific implementation, in an embodiment, the computer device 100 may include a plurality of processors, such as the processor 101 and a processor 105 in FIG. 4. Each of the processors may be a single-core (single-CPU) processor, or may be a multi-core (multi-CPU) processor. The processor herein may be one or more devices, circuits, and/or processing cores configured to process data (for example, a computer program instruction).

The communications bus 102 may be an industry standard architecture (English full name: Industry Standard Architecture, ISA for short) bus, a Peripheral Component Interconnect (English full name: Peripheral Component, PCI for short) bus, an extended industry standard architecture (English full name: Extended Industry Standard Architecture, EISA for short) bus, or the like. The bus may be classified into an address bus, a data bus, a control bus, and the like. For ease of representation, only one bold line is used in FIG. 4 to represent the communications bus 102, but it does not indicate that there is only one bus or one type of bus.

The memory 103 may be a read-only memory (English full name: read-only memory, ROM for short), a static storage device of another type that can store static information and an instruction, a random access memory (English full name: random access memory, RAM for short), or a dynamic storage device of another type that can store information and an instruction, or may be an electrically erasable programmable read-only memory (English full name: Electrically Erasable Programmable Read-Only Memory, EEPROM for short), a compact disc read-only memory (English full name: Compact Disc Read-Only Memory, CD-ROM for short), another compact disc storage, optical disc storage (including a compact disc, a laser disc, an optical disc, a digital versatile disc, a Blue-ray disc, or the like), a disk storage medium or another disk storage device, or any other medium that can be used to carry or store expected program code in a form of an instruction or a data structure and that can be accessed by a computer. However, this is not limited herein. The memory may exist independently and is connected to the processor by using the bus. Alternatively, the memory may be integrated with the processor.

The memory 103 is configured to store application program code for executing the solutions of the present invention, and execution of the application program code is controlled by the processor 101. The processor 101 is configured to execute the application program code stored in the memory 103.

The communications interface 104, by using any apparatus of a transceiver type, is configured to communicate with another device or a communications network, such as an Ethernet, a radio access network (RAN), or a wireless local area network (English full name: Wireless Local Area Networks, WLAN for short). The communications interface 104 may include a receiving unit for implementing a receiving function, and a sending unit for implementing a sending function.

It should be noted that UCI includes channel state information (English full name: channel state information, CSI for short), hybrid automatic repeat request (English full name: hybrid automatic repeat request, HARQ for short) feedback information, and a scheduling request (English full name: scheduling request, SR for short). The CSI includes a channel quality indicator (English full name: channel quality indicator, CQI for short), a precoding matrix indicator (English full name: precoding matrix indicator, PMI), a precoding type indicator (English full name: precoding type indicator, PTI for short), and/or a rank indication (English full name: rank indication, RI for short).

Because resources are allocated by the base station, the UE may have both a PUCCH resource and a PUSCH resource in a same subframe. In this case, the UE may simultaneously transmit PUCCH UCI and PUSCH data. However, due to a radio frequency link limitation of the UE, the UE cannot simultaneously transmit a PUCCH and a PUSCH. Therefore, the UE multiplexes the PUCCH UCI on a PUSCH data resource for transmission, to avoid simultaneous transmission of the PUCCH and the PUSCH.

In an implementation, the user equipment includes a processor, a memory, and a transmitter. The processor included in the UE is configured to pre-configure first uplink control information UCI and second UCI. The memory is configured to store the first UCI and the second UCI. The processor is further configured to perform CCA or LBT on the first cell. If it is detected that the first cell is not idle, the transmitter is specifically configured to transmit the UCI on the PUCCH resource; or if it is detected that the first cell is idle, the transmitter is specifically configured to transmit the UCI on a PUSCH resource of the first cell.

The first UCI is carried on the physical uplink shared channel PUSCH resource of the first cell for transmission, the second UCI is carried on the physical uplink control channel PUCCH resource for transmission, and the first cell is a cell on which clear channel assessment CCA or listen before talk LBT detection needs to be performed.

In this way, the user equipment pre-configures the first UCI and the second UCI, adds the first UCI to the physical uplink shared channel PUSCH resource of the first cell for transmission, adds the second UCI to the physical uplink control channel PUCCH resource for transmission, and sends the first UCI or the second UCI to the base station, to effectively ensure that when the user equipment has both a PUCCH resource and a PUSCH resource, the UCI can be transmitted to the base station.

In an implementation, when the user equipment has both a physical uplink control channel PUCCH resource and a physical uplink shared channel PUSCH resource in a current subframe, a transmitter included in the user equipment is configured to transmit uplink control information UCI based on a cell type of a cell in which the PUSCH resource is located, where the cell type of the cell in which the PUSCH resource is located includes a first cell and a second cell, or the cell type of the cell in which the PUSCH resource is located includes only a first cell, the first cell is a cell on which clear channel assessment CCA or listen before talk LBT detection needs to be performed, and the second cell is a cell on which CCA or LBT detection does not need to be performed.

In this way, the user equipment has both a PUSCH resource of the first cell and a PUSCH resource of the second cell, and the user equipment may transmit the UCI based on the cell type of the cell in which the PUSCH resource is located, to effectively ensure that when the user equipment has both the PUCCH resource and the PUSCH resource, the UCI can be transmitted to the base station and the base station receives the UCI.

Specifically, there are the following two implementations for transmitting, by the user equipment, the uplink control information UCI based on the cell type of the cell in which the PUSCH resource is located.

A receiver is configured to receive first configuration information sent by the base station, where the first configuration information includes a cell index of the first cell and a cell index of the second cell, and the cell index of the first cell is greater than the cell index of the second cell; or the first configuration information includes only a cell index of the first cell.

The transmitter is specifically configured to:

when the cell type of the cell in which the PUSCH resource is located includes a first cell and at least one second cell, transmit the UCI after the UCI is added to a PUSCH resource of a second cell with a minimum cell index.

The transmitter is specifically configured to:

when the cell type of the cell in which the PUSCH resource is located includes only a first cell, skip sending the UCI, or transmit the UCI on the PUCCH resource.

In an implementation, when the user equipment has both a physical uplink control channel PUCCH resource and a physical uplink shared channel PUSCH resource in a subframe K, a processor included in the user equipment is configured to add UCI to a PUSCH resource of a first cell in at least one subframe after the subframe K, where the first cell is a cell on which clear channel assessment CCA or listen before talk LBT detection needs to be performed. A transmitter is configured to transmit the UCI on the PUSCH resource.

In this way, after adding the UCI to the PUSCH resource of the first cell, the user equipment transmits the UCI on the PUSCH resource in the at least one subframe after the subframe K, to effectively ensure that when the user equipment has both the PUCCH resource and the PUSCH resource, the UCI can be transmitted to the base station and the base station receives the UCI.

A cell type of a cell in which the PUCCH resource is located includes a first cell or a second cell, the second cell is a cell on which clear channel assessment CCA or listen before talk LBT detection does not need to be performed, and when the cell type of the cell in which the PUCCH resource is located is a first cell, duration occupied by the PUCCH resource is less than or equal to duration of a subframe.

When a cell type of a cell in which the PUCCH resource is located is a first cell, the PUCCH includes a PUCCH that is distributed over an entire bandwidth or most contiguous or non-contiguous bandwidths, and the processor is specifically configured to:

add the UCI to the PUSCH resource of the first cell based on a cell index of the first cell.

The processor is further configured to perform CCA or LBT on the first cell.

If it is detected that the first cell is idle, the transmitter is specifically configured to transmit the UCI on the PUSCH resource in the at least one subframe after the subframe K.

If it is detected that the first cell is not idle, the processor is further configured to continue to perform CCA or LBT on the first cell.

If the user equipment detects that the first cell is idle, the transmitter is further configured to transmit the UCI on a PUSCH resource in at least one subframe after a subframe K+1.

In an implementation, when the user equipment simultaneously transmits a physical uplink control channel PUCCH and a physical uplink shared channel PUSCH in a subframe K, a receiver included in the user equipment is configured to receive first configuration information sent by the base station, where the first configuration information includes: physical uplink control channel PUCCH resource location information and at least one of a PUCCH timer Timer, a transmission opportunity TXOP, uplink resource duration allocated by the base station, and a PUCCH location at which channel state information CSI is located, and the PUCCH resource location information includes at least two candidate locations of a PUCCH resource. A processor is configured to perform listen before talk LBT based on the first configuration information, to obtain an LBT result, and the processor is further configured to determine a location of the PUCCH resource in a subframe based on the LBT result.

In this way, the user equipment performs LBT by using the first configuration information, and determines a location of the PUCCH resource in a subframe based on the LBT result, to effectively ensure that when the user equipment has both a PUCCH resource and a PUSCH resource, the UCI can be transmitted to the base station as soon as possible and the base station receives the UCI.

The following specific embodiments are used to describe in detail how UE transmits UCI to an eNB.

Embodiment 2

Figure 5:
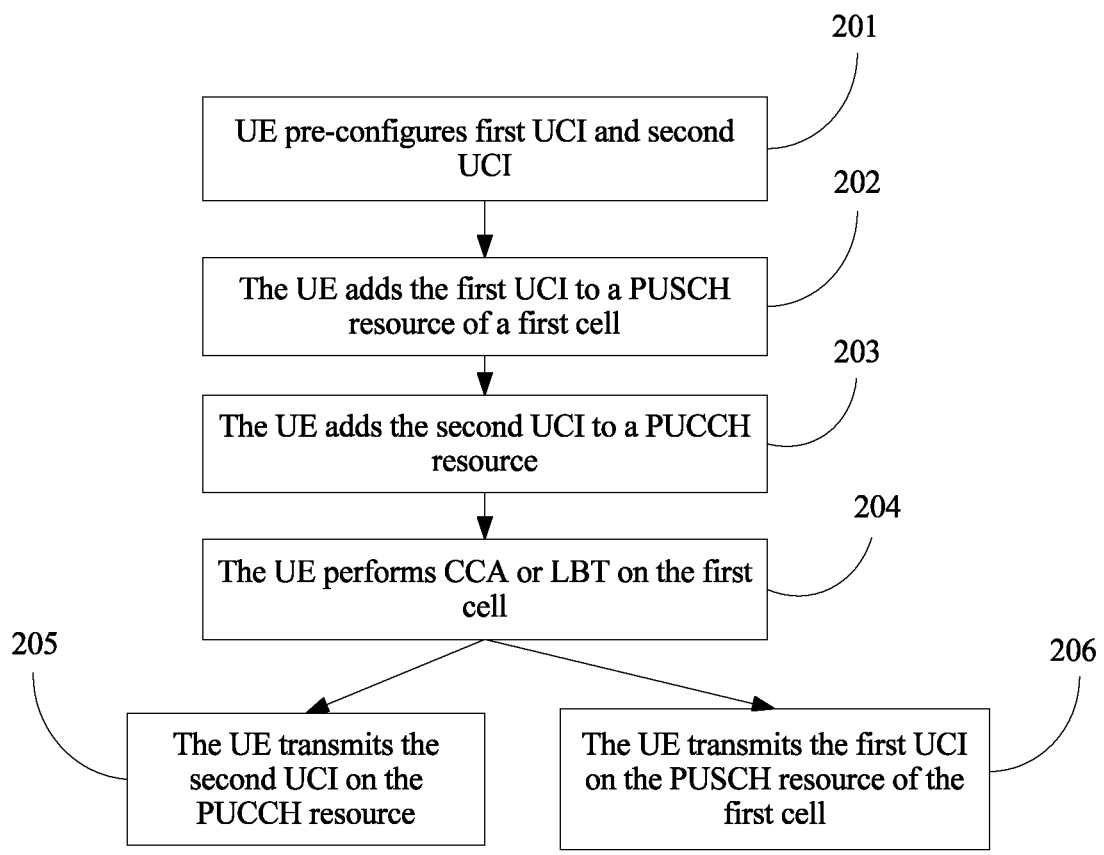
FIG. 5 is a flowchart of an uplink control information transmission method according to an embodiment of the present invention.

This embodiment of the present invention provides an uplink control information transmission method. As shown in FIG. 5, the method includes the following steps.

Step 201. UE pre-configures first UCI and second UCI.

The first UCI is carried on a physical uplink shared channel PUSCH resource of a first cell for transmission, the second UCI is carried on a physical uplink control channel PUCCH resource for transmission, and the first cell is a cell on which CCA or LBT detection needs to be performed, and may be an unlicensed spectrum cell or a licensed spectrum cell.

Step 202. The UE adds the first UCI to a PUSCH resource of a first cell.

Step 203. The UE adds the second UCI to a PUCCH resource.

Step 204. The UE performs CCA or LBT on the first cell.

It should be noted that, a sequence of steps in the uplink control information transmission method provided in this embodiment of the present invention may be adjusted properly. For example, a sequence of step 202 to step 204 can be changed. To be specific, CCA or LBT may be performed on the first cell before the first UCI is added to the PUSCH resource of the first cell, or before the second UCI is added to the PUCCH resource. Any variation method readily figured out by a person skilled in the art within the technical scope disclosed in the present invention shall fall within the protection scope of the present invention, and therefore details are not described herein.

The UE detects a channel status of the first cell based on the CCA or the LBT detection. The channel status of the first cell includes an idle state and a non-idle state.

When detecting that the first cell is not idle, the UE performs step 205.

When detecting that the first cell is idle, the UE performs step 206.

Step 205. The UE transmits the second UCI on the PUCCH resource.

Step 206. The UE transmits the first UCI on the PUSCH resource of the first cell.

Figure 6:
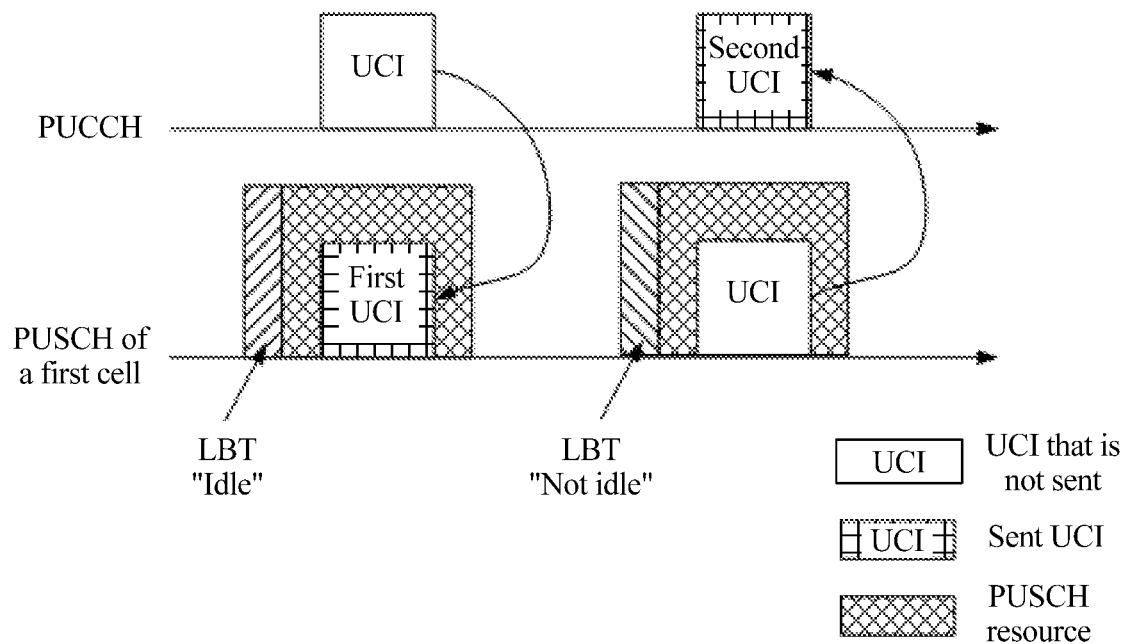
FIG. 6 is a schematic diagram of uplink control information transmission according to an embodiment of the present invention.

As shown in FIG. 6, there is both a PUSCH resource and a PUCCH resource in one subframe. In this case, the UE pre-configures first UCI and second UCI. The first UCI is carried on a PUSCH resource of a first cell for transmission, and the second UCI is carried on the PUCCH resource for transmission. If it is detected, based on LBT detection, that the first cell is idle, the UE transmits the first UCI on the PUSCH resource of the first cell. If it is detected, based on LBT detection, that the first cell is not idle, the UE immediately transmits the second UCI on the original PUCCH resource.

In this way, the user equipment pre-configures the first UCI and the second UCI, adds the first UCI to the physical uplink shared channel PUSCH resource of the first cell for transmission, adds the second UCI to the physical uplink control channel PUCCH resource for transmission, and sends the first UCI or the second UCI to a base station, to effectively ensure that when the user equipment has both the PUCCH resource and the PUSCH resource, the UCI can be transmitted to the base station.

The method steps shown in FIG. 5 may be specifically implemented by the computer device shown in FIG. 4. For example, step 204, step 205, and another sending or receiving method step each may be implemented by the communications interface 104. A processing method step such as step 201 may be implemented by the processor 101.

Embodiment 3

Figure 7:
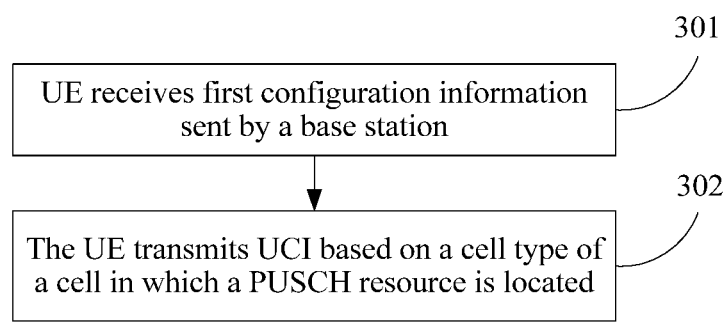
FIG. 7 is a flowchart of another uplink control information transmission method according to an embodiment of the present invention.

This embodiment of the present invention provides an uplink control information transmission method. As shown in FIG. 7, the method includes the following steps.

Step 301. UE receives first configuration information sent by a base station.

The UE may send a measurement report to the base station. After receiving the measurement report, the base station sends the first configuration information to the UE.

The first configuration information includes a cell index of a first cell and a cell index of a second cell, and the cell index of the first cell is greater than the cell index of the second cell.

Alternatively, the first configuration information includes a cell index of a first cell or a cell index of a second cell.

The first cell is a cell on which clear channel assessment (English full name: Clear Channel Assessment, CCA for short) or listen before talk LBT detection needs to be performed, and may be an unlicensed spectrum cell or a licensed spectrum cell. The second cell is a cell on which CCA or LBT detection does not need to be performed, and may be an unlicensed spectrum cell or a licensed spectrum cell.

It is limited in the present invention that the base station pre-configures the cell index of the first cell and the cell index of the second cell, where the cell index of the first cell is greater than the cell index of the second cell, and sends the cell index to the user equipment.

Step 302. The UE transmits UCI based on a cell type of a cell in which a PUSCH resource is located.

The cell type of the cell in which the PUSCH resource is located includes a first cell and a second cell. Alternatively, the cell type of the cell in which the PUSCH resource is located includes only a first cell.

Specifically, when the cell type of the cell in which the PUSCH resource is located includes a first cell and at least one second cell, the UE sorts serving cells based on a cell index value, and transmits the UCI by adding the UCI to a PUSCH resource of a second cell with a minimum cell index.

Figure 8:
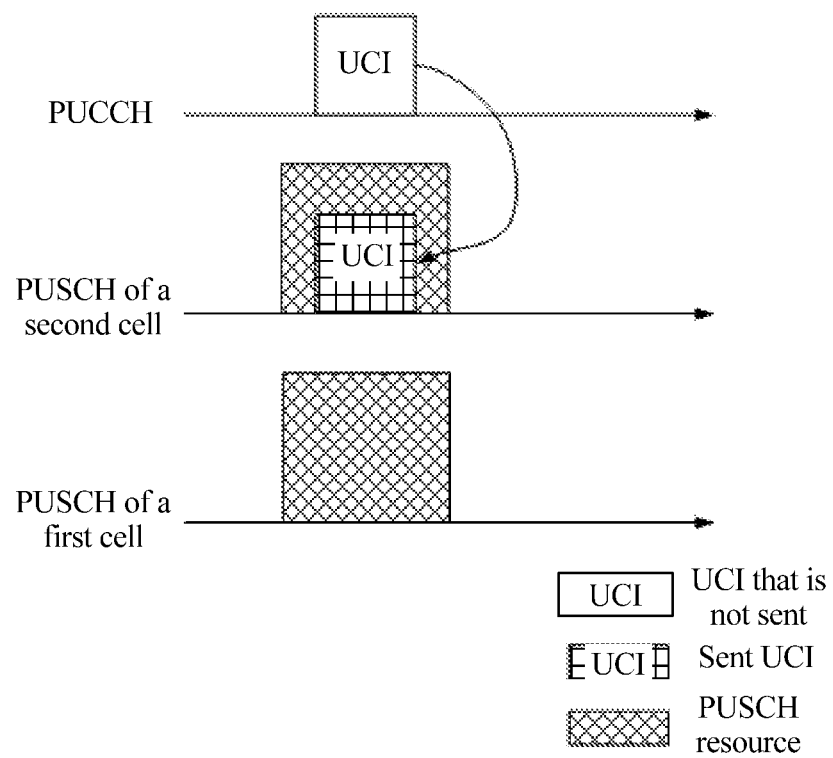
FIG. 8 is another schematic diagram of uplink control information transmission according to an embodiment of the present invention.

As shown in FIG. 8, the UE has both a PUSCH resource of a first cell and a PUSCH resource of a second cell. Because a cell index of the first cell is greater than a cell index of the second cell, the UE can add UCI only to the PUSCH resource of the second cell and transmit the UCI.

In this way, the user equipment has both a PUSCH resource of the first cell and a PUSCH resource of the second cell, and the user equipment may transmit the UCI based on the cell type of the cell in which the PUSCH resource is located, to effectively ensure that when the user equipment has both a PUCCH resource and a PUSCH resource, the UCI can be transmitted to the base station and the base station receives the UCI.

When the cell type of the cell in which the PUSCH resource is located includes only a first cell, the UE does not send the UCI, or transmits the UCI on a PUCCH resource.

Figure 9:
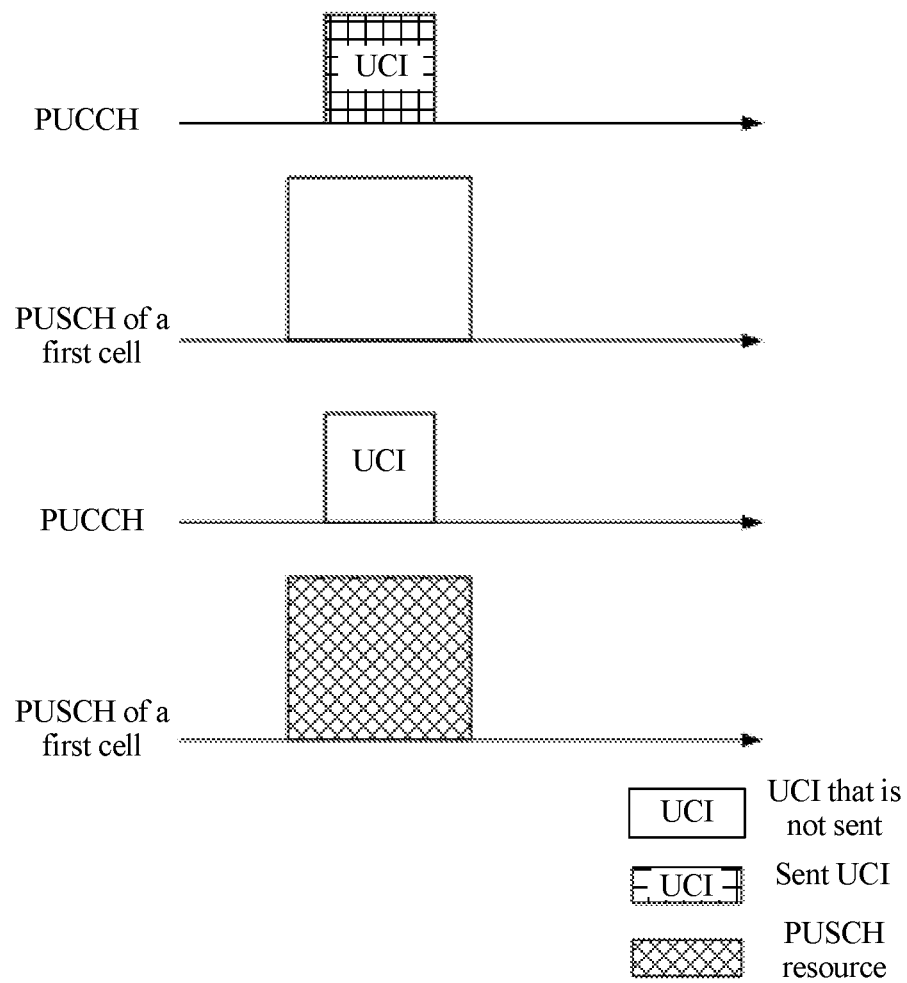
FIG. 9 is still another schematic diagram of uplink control information transmission according to an embodiment of the present invention.

As shown in FIG. 9, the UE has both a PUSCH resource of a first cell and a PUCCH resource. Therefore, only the PUSCH or only the PUCCH is sent.

In this way, when the cell type of the cell in which the PUSCH resource is located includes only a first cell, the UE may transmit the UCI by adding the UCI to the PUCCH resource, or may not transmit the UCI, so that the user equipment is prevented from simultaneously transmitting a PUCCH and a PUSCH.

It should be noted that when the cell type of the cell in which the PUSCH resource is located includes only a second cell, the UE transmits, according to an existing communication protocol, the UCI by adding the UCI to the PUSCH resource of the second cell.

The method steps shown in FIG. 7 may be specifically implemented by the computer device shown in FIG. 4. For example, step 301 and another sending or receiving method step each may be implemented by the communications interface 104.

Embodiment 4

Figure 10:
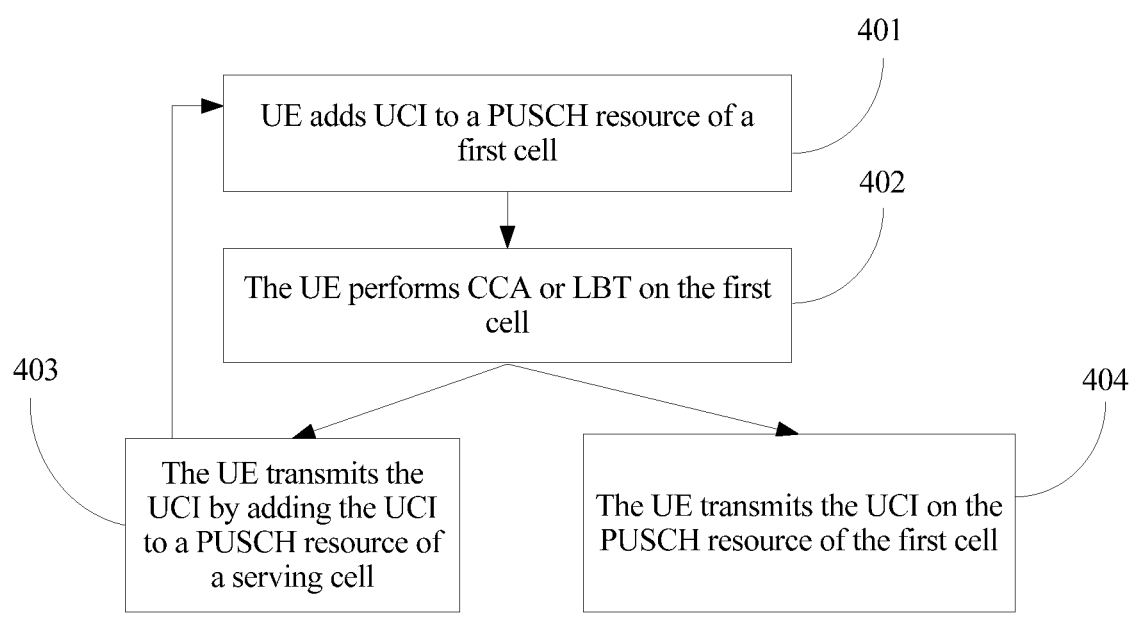
FIG. 10 is a flowchart of still another uplink control information transmission method according to an embodiment of the present invention.

This embodiment of the present invention provides an uplink control information transmission method. As shown in FIG. 10, the method includes the following steps.

Step 401. UE adds UCI to a PUSCH resource of a first cell.

Step 402. The UE performs CCA or LBT on the first cell.

It should be noted that, a sequence of steps in the uplink control information transmission method provided in this embodiment of the present invention may be adjusted properly. For example, a sequence of step 401 and step 402 can be changed. To be specific, CCA or LBT may be performed on the first cell before the UCI is added to the PUSCH resource of the first cell. Any variation method readily figured out by a person skilled in the art within the technical scope disclosed in the present invention shall fall within the protection scope of the present invention, and therefore details are not described herein.

The UE detects a channel status of the first cell based on the CCA or the LBT detection. The channel status of the first cell includes an idle state and a non-idle state.

When detecting that the first cell is not idle, the UE performs step 403.

When detecting that the first cell is idle, the UE performs step 404.

Step 403. The UE transmits the UCI by adding the UCI to a PUSCH resource of a serving cell.

The serving cell includes a first cell and/or a second cell. When the UE transmits the UCI by adding the UCI to the PUSCH resource of the serving cell, the UCI does not include a hybrid automatic repeat request HARQ feedback.

When the serving cell is a first cell, the UE performs step 402 to step 404.

Step 404. The UE transmits the UCI on the PUSCH resource of the first cell.

Figure 11:
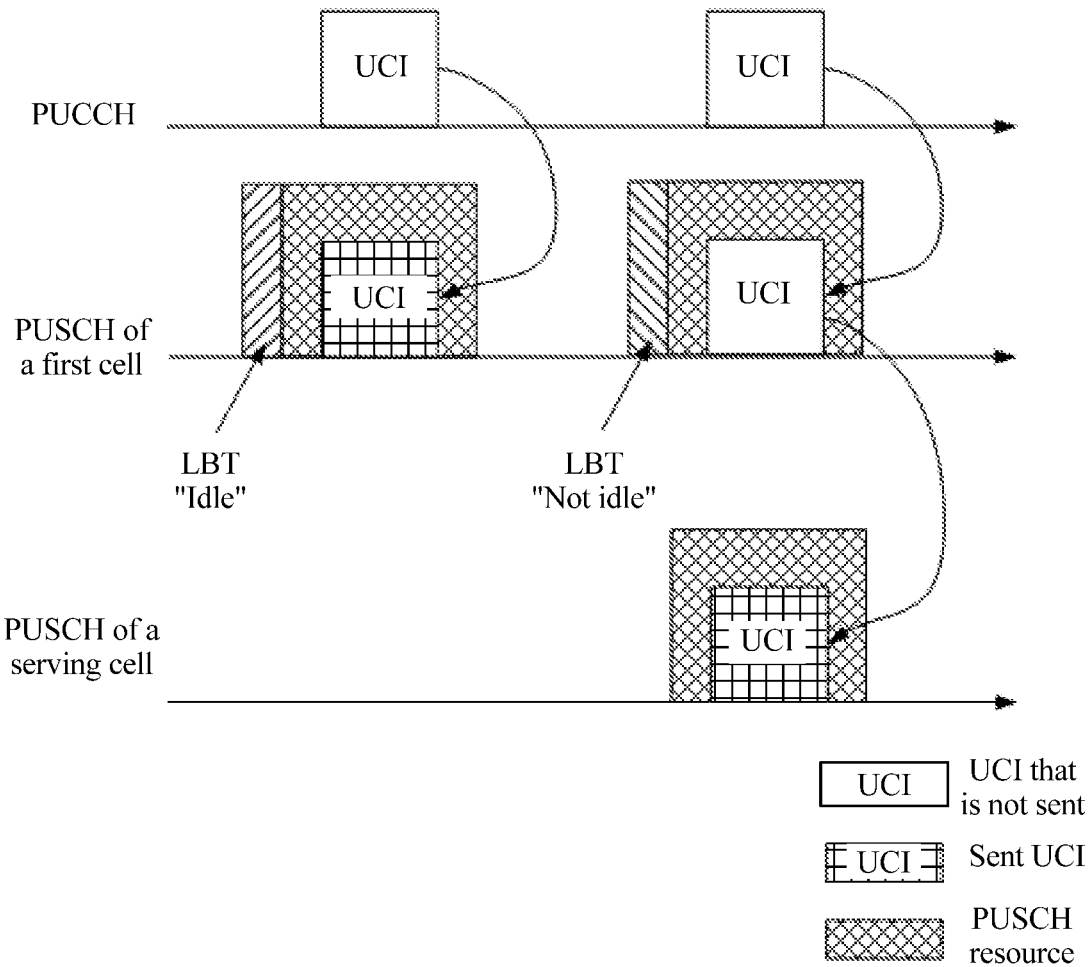
FIG. 11 is yet another schematic diagram of uplink control information transmission according to an embodiment of the present invention.

As shown in FIG. 11, the UE adds UCI to a PUSCH resource of a first cell. When the UE detects that the first cell is idle, the UE transmits the UCI on the PUSCH resource of the first cell; or when the UE detects that the first cell is not idle, the UE transmits the UCI by adding the UCI to a PUSCH resource of a serving cell.

In this way, the UE adds the UCI to the PUSCH resource of the first cell. When the UE detects that the first cell is idle, the UE transmits the UCI on the PUSCH resource of the first cell; or when the UE detects that the first cell is not idle, the UE transmits the UCI by adding the UCI to the PUSCH resource of the serving cell, to effectively ensure that when the user equipment has both a PUCCH resource and a PUSCH resource, the UCI can be transmitted to a base station.

The method steps shown in FIG. 10 may be specifically implemented by the computer device shown in FIG. 4. For example, step 403 and another sending or receiving method step each may be implemented by the communications interface 104. A processing method step such as step 401 may be implemented by the processor 101.

Embodiment 5

Figure 12:
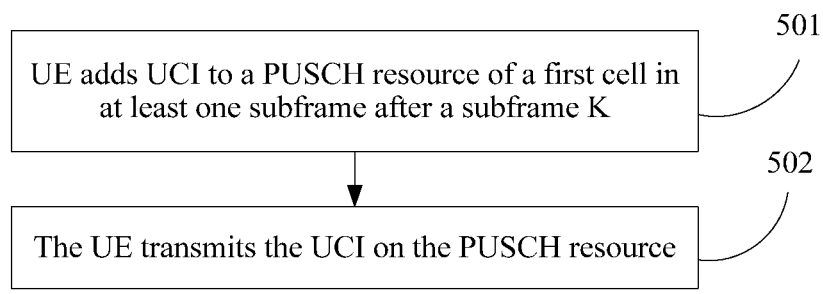
FIG. 12 is a flowchart of yet another uplink control information transmission method according to an embodiment of the present invention.

This embodiment of the present invention provides an uplink control information transmission method. As shown in FIG. 12, the method includes the following steps:

Step 501. UE adds UCI to a PUSCH resource of a first cell in at least one subframe after a subframe K.

Step 502. The UE transmits the UCI on the PUSCH resource.

When an eNB allocates an uplink resource, a subframe scheduled for one uplink grant (UL grant) is not limited to only one subframe, but time-frequency resources in a plurality of subframes may be simultaneously scheduled for one UL grant. An uplink resource needs to be allocated before uplink data is sent. Optionally, a specific quantity of subframes after the uplink resource is allocated and before the uplink data is sent may be less than four, or may be greater than or equal to four.

Figure 13:
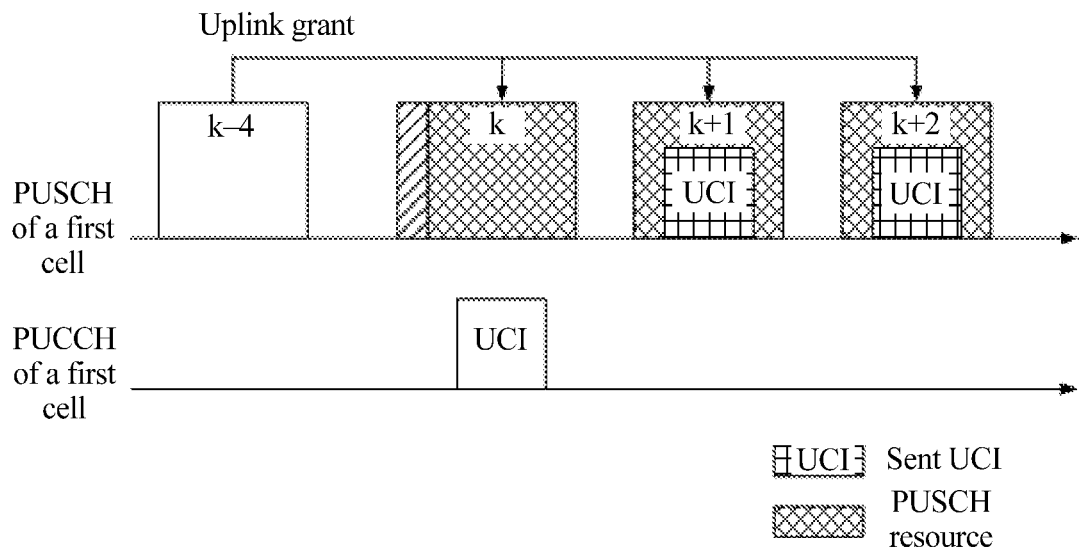
FIG. 13 is still yet another schematic diagram of uplink control information transmission according to an embodiment of the present invention.

As shown in FIG. 13, the eNB allocates an uplink resource in a subframe k−4. To be specific, time-frequency resources in subframes k, k+1, and k+2 are allocated. In the subframe k+1, the UE adds UCI to a PUSCH resource of a first cell, and transmits the UCI on a PUSCH resource in at least one subframe after the subframe k+1, for example, the subframe k+1 and the subframe k+2. The first cell is a cell on which clear channel assessment CCA or listen before talk LBT detection needs to be performed.

In this way, the UE has both a PUCCH resource and a PUSCH resource in the subframe K, and transmits the UCI on the PUSCH resource in the at least one subframe after the subframe K, so that the user equipment is prevented from simultaneously transmitting a PUCCH and a PUSCH, to effectively ensure that the UCI can be transmitted to the base station.

It should be noted that a cell type of a cell in which the PUCCH resource is located includes a first cell or a second cell, and when the cell type of the cell in which the PUCCH resource is located is a first cell, duration occupied by the PUCCH resource is less than or equal to duration of a subframe.

In another implementation, if a cell type of a cell in which the PUCCH resource is located is a first cell, and the PUCCH includes a PUCCH that is distributed over an entire bandwidth or most contiguous or non-contiguous bandwidths. The cell type of the cell in which the PUCCH resource is located is a first cell. The UE adds the UCI to the PUSCH resource of the first cell based on a cell index of the first cell.

Figure 14:
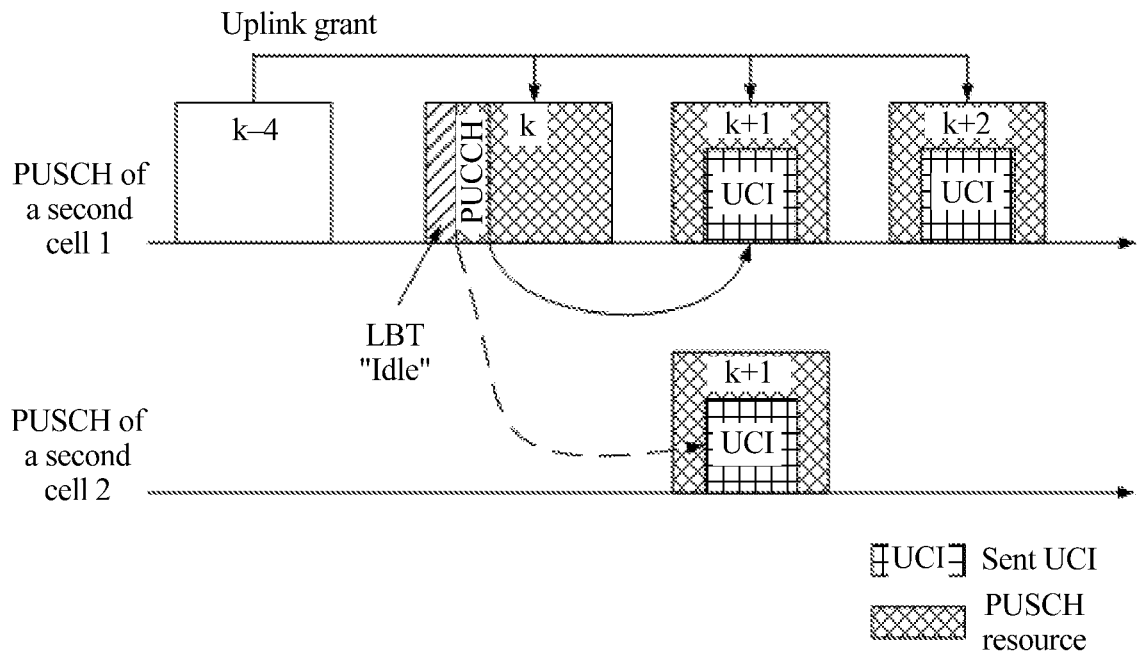
FIG. 14 is a further schematic diagram of uplink control information transmission according to an embodiment of the present invention.

As shown in FIG. 14, the eNB allocates an uplink resource in a subframe k−4. To be specific, time-frequency resources in subframes k, k+1, and k+2 are allocated. The UE includes both a PUCCH resource of a second cell 1 and a PUSCH resource of a second cell 2 in the subframe k+1, and the UE adds UCI to the PUSCH resource of a first cell for transmission. The UCI may be carried on the second cell 1 or the second cell 2. Specifically, optionally, the UE may select, based on a cell index value, a PUSCH resource of a serving cell with a minimum cell index to carry and transmit the UCI. It is assumed that the UCI is carried on the second cell 1. The PUCCH UCI is carried in (including the subframe k+1) at least one subframe after the subframe k+1, for example, the subframe k+1 and the subframe k+2.

Figure 15:
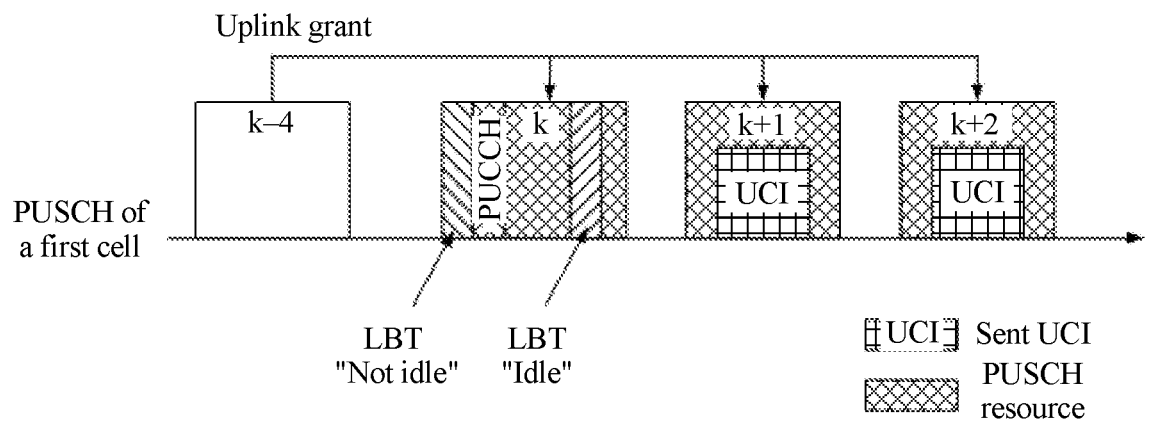
FIG. 15 is a still further schematic diagram of uplink control information transmission according to an embodiment of the present invention.

In another implementation, as shown in FIG. 15, if a cell type of a cell in which the PUCCH resource is located is a first cell, the PUCCH includes a PUCCH that is distributed over an entire bandwidth or most contiguous or non-contiguous bandwidths, in other words, a large-bandwidth PUCCH, and a cell type of a cell in which the PUSCH resource is located is a first cell.

The UE performs CCA or LBT on the first cell. If it is detected that the first cell is idle, the user equipment transmits the UCI on the PUSCH resource in the at least one subframe after the subframe K.

If it is detected that the first cell is not idle, the user equipment continues to perform CCA or LBT on the first cell. If it is detected that the first cell is idle, the user equipment transmits the UCI on a PUSCH resource in at least one subframe after a subframe K+1.

It should be noted that in this embodiment of the present invention, a large-bandwidth PUCCH used by an unlicensed spectrum cell is different from an original PUCCH. Therefore, it may be recommended that the UCI "simultaneously" transmitted on the PUCCH and the PUSCH is strictly sent in different OFDM symbols.

Embodiment 6

Figure 16:
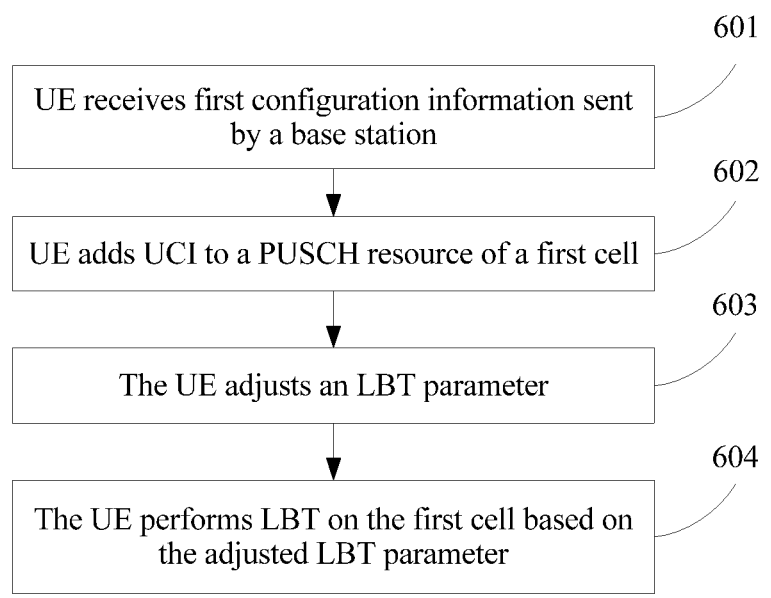
FIG. 16 is a flowchart of still yet another uplink control information transmission method according to an embodiment of the present invention.

This embodiment of the present invention provides an uplink control information transmission method. As shown in FIG. 16, the method includes the following steps.

Step 601. UE receives first configuration information sent by a base station.

The first configuration information includes an LBT parameter, such as an LBT priority class (LBT priority class), a defer period (defer period), or a contention window size (English full name: contention window size, CWS for short), and the LBT parameter is used to perform LBT, so as to preempt a channel resource by using LBT.

Step 602. The UE adds UCI to a PUSCH resource of a first cell.

The first cell is a cell on which clear channel assessment CCA or listen before talk LBT detection needs to be performed, and may be an unlicensed spectrum cell or a licensed spectrum cell.

Step 603. The UE adjusts an LBT parameter.

For example, the LBT priority class is reduced, the defer period is shortened, and the CWS window is reduced, so as to preempt a channel resource more quickly by using the LBT.

Step 604. The UE performs LBT on the first cell based on the adjusted LBT parameter.

The UE detects a channel status of the first cell based on the LBT detection. The channel status of the first cell includes an idle state and a non-idle state. When detecting that the first cell is not idle, as described in Embodiment 2, the UE may transmit the UCI on a PUCCH resource; or when the UE detects that the first cell is idle, the UE transmits the UCI on the PUSCH resource of the first cell.

It should be noted that, a sequence of steps in the uplink control information transmission method provided in this embodiment of the present invention may be adjusted properly. For example, a sequence of step 602 and step 603 can be changed. Likewise, step 602 may also be performed after step 602. Any variation method readily figured out by a person skilled in the art within the technical scope disclosed in the present invention shall fall within the protection scope of the present invention, and therefore details are not described herein.

Optionally, if a PUCCH is in the first cell, compared with a PUCCH in a second cell, where the second cell is a cell on which CCA or LBT detection does not need to be performed, the PUCCH of the first cell is distributed over an entire bandwidth or most contiguous or non-contiguous bandwidths. The PUCCH is located only at a determined location or a plurality of locations of a subframe, and a specific location depends on the LBT. The UE may preempt a channel resource based on a PUCCH LBT parameter in the configuration message. Certainly, the UE may alternatively preempt a channel resource based on a PUSCH LBT parameter in the configuration message. In addition, the UE may adjust the LBT parameter in the configuration information, for example, reduce the LBT priority class, shorten the defer period, reduce the CWS window, or shorten a CCA assessment time, so as to preempt a channel resource more quickly.

Optionally, the PUSCH LBT parameter may be changed. For example, an LBT priority class is reduced, a defer period is shortened, a CWS window is reduced, or a CCA assessment time is shortened, so as to preempt a channel resource more quickly by using the LBT.

It should be noted that in this embodiment of the present invention, a large-bandwidth PUCCH used by an unlicensed spectrum cell is different from an original PUCCH. Therefore, it may be recommended that the UCI "simultaneously" transmitted on the PUCCH and the PUSCH is strictly sent in different OFDM symbols.

Embodiment 7

Figure 17:
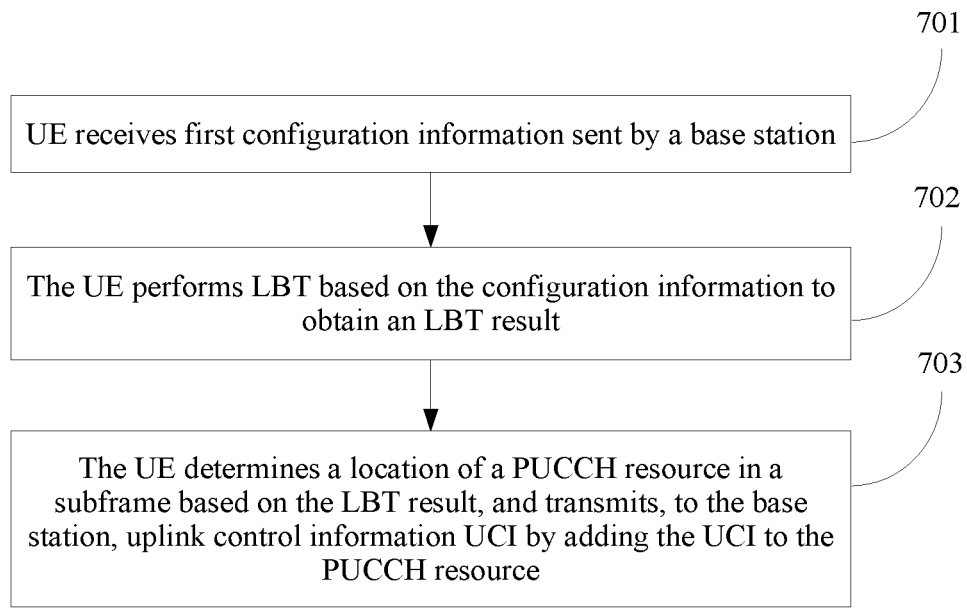
FIG. 17 is a flowchart of a further uplink control information transmission method according to an embodiment of the present invention.

This embodiment of the present invention provides an uplink control information transmission method. As shown in FIG. 17, the method includes the following steps.

Step 701. UE receives first configuration information sent by a base station.

The first configuration information includes: physical uplink control channel PUCCH resource location information and at least one of a PUCCH timer Timer, a transmission opportunity TXOP, uplink resource duration allocated by the base station, and a PUCCH location at which channel state information CSI is located, and the PUCCH resource location information includes at least one candidate location of a PUCCH resource. The PUCCH timer Timer is configured to limit a time for performing LBT. The TXOP is used to indicate a time in which a channel is occupied.

Step 702. The UE performs LBT based on the configuration information to obtain an LBT result.

Step 703. The UE determines a location of a PUCCH resource in a subframe based on the LBT result, and transmits, to the base station, uplink control information UCI by adding the UCI to the PUCCH resource.

When the eNB allocates an uplink resource, a subframe scheduled for one uplink grant (UL grant) is not limited to only one subframe, but time-frequency resources in a plurality of subframes may be simultaneously scheduled for one UL grant. An uplink resource needs to be allocated before uplink data is sent. Optionally, a specific quantity of subframes after the uplink resource is allocated and before the uplink data is sent may be less than four, or may be greater than or equal to four.

Figure 18:
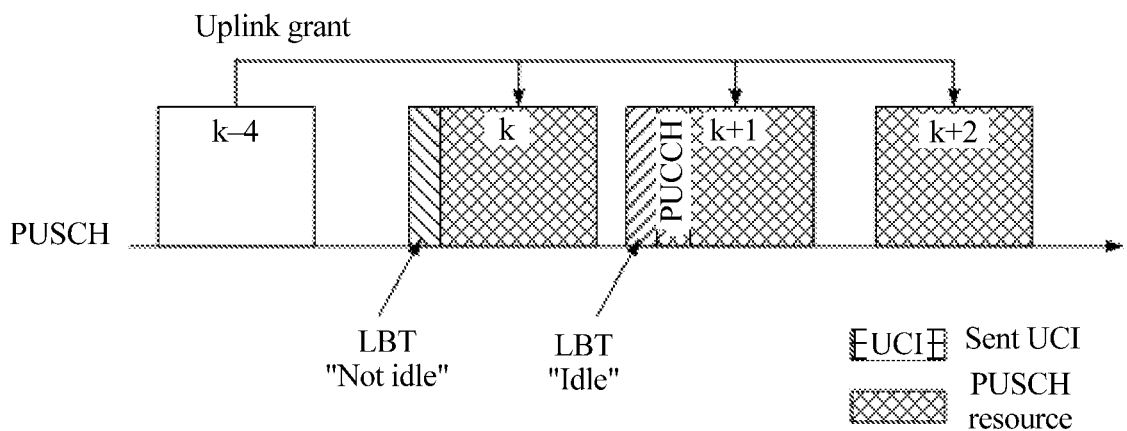
FIG. 18 is a yet further schematic diagram of uplink control information transmission according to an embodiment of the present invention.

As shown in FIG. 18, the UE starts performing LBT in a subframe k, but the LBT keeps failing. The UE determines a location of a PUCCH resource in a subframe based on an LBT result. The LBT succeeds in a subframe k+1. Therefore, the UE preferentially sends the PUCCH resource, and then sends a PUSCH.

In this way, the UE performs LBT based on the received configuration information sent by the base station, and then determines, based on the LBT result, a location of the PUCCH in a subframe more quickly and accurately, to effectively ensure that the PUCCH can be transmitted to the base station.

Embodiment 8

Figure 19:
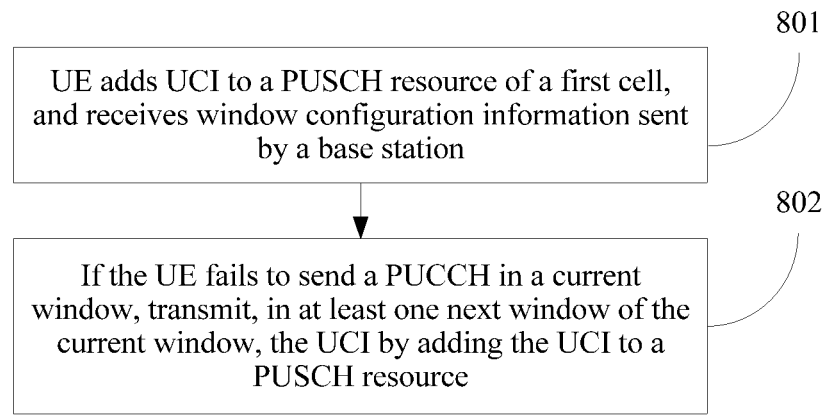
FIG. 19 is a flowchart of a still further uplink control information transmission method according to an embodiment of the present invention.

This embodiment of the present invention provides an uplink control information transmission method. As shown in FIG. 19, the method includes the following steps.

Step 801. UE receives window configuration information sent by a base station.

The window configuration information includes a start location, an intermediate location, or an end location of a window, and a window period.

Step 802. If the UE fails to send a PUCCH in a current window, transmit, in at least one next window of the current window, UCI by adding the UCI to a PUSCH resource.

It should be noted that if the UE fails to send the PUCCH in the current window, the UCI that is carried on the PUSCH resource is transmitted in the at least one next window of the current window, only when CCA or LBT is performed on a cell in which the PUSCH is located and it is detected that the cell in which the PUSCH is located is idle.

Figure 20:
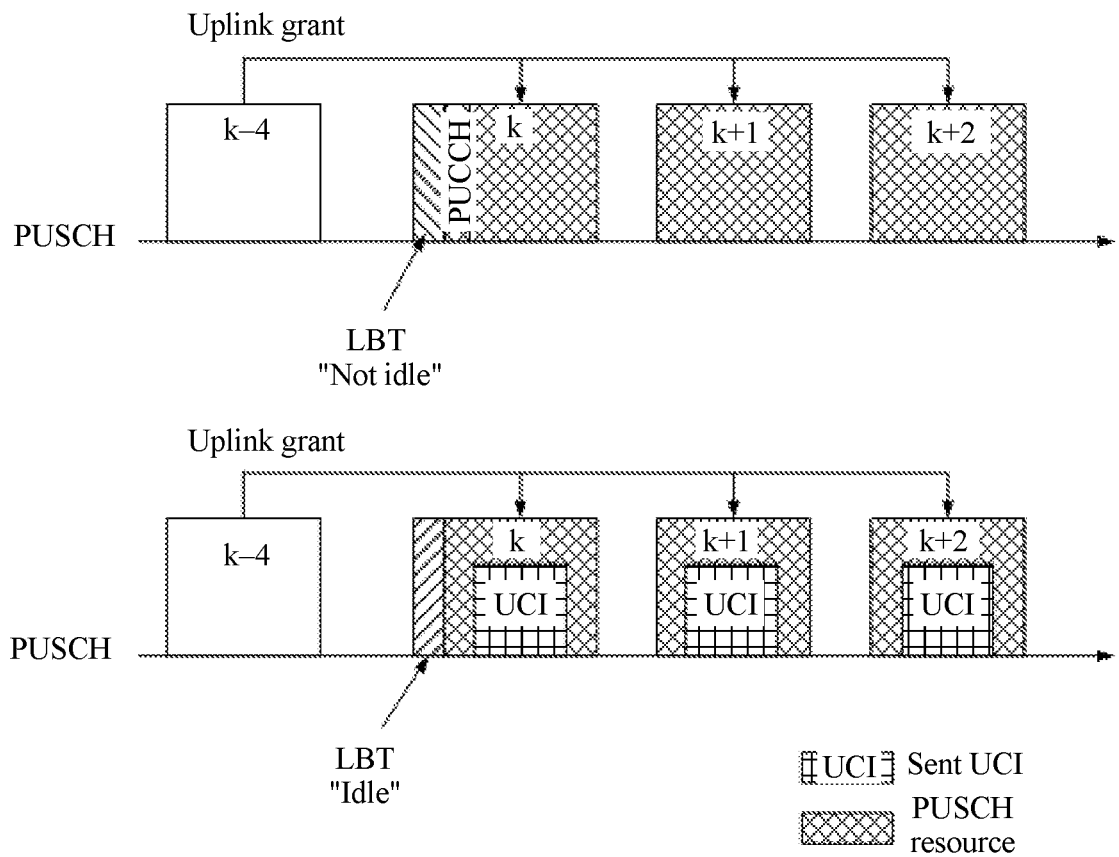
FIG. 20 is a still yet further schematic diagram of uplink control information transmission according to an embodiment of the present invention.

As shown in FIG. 20, the UE fails to preempt a channel resource in a first TXOP time, and therefore a UCI cannot be sent. However, the UE preempts a channel resource in a second TXOP, but there is no PUCCH resource, and therefore UCI is carried on a PUSCH. In this way, if no channel resource has been preempted at all in a transmission opportunity (English full name: transmission opportunity, TXOP for short) window, the UCI is carried on the PUSCH resource for transmission in a next TXOP window even if there is no PUCCH resource, to effectively ensure that the UCI can be transmitted to the base station.

Embodiment 9

Figure 21:
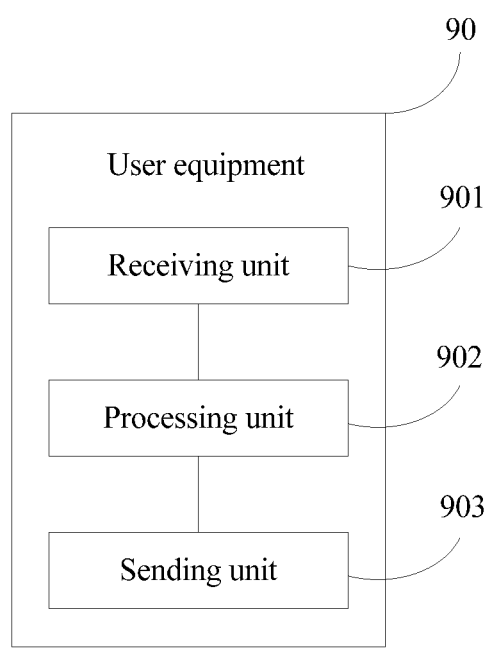
FIG. 21 is a schematic structural diagram of user equipment according to an embodiment of the present invention.

This embodiment of the present invention provides user equipment 90. As shown in FIG. 21, the user equipment 90 includes:

a receiving unit 901, a processing unit 902, and a sending unit 903.

In an implementation, the processing unit 902 is configured to pre-configure first uplink control information UCI and second UCI, where the first UCI is carried on a physical uplink shared channel PUSCH resource of a first cell for transmission, the second UCI is carried on a physical uplink control channel PUCCH resource for transmission, and the first cell is a cell on which clear channel assessment CCA or listen before talk LBT detection needs to be performed.

The sending unit 903 is configured to send the first UCI or the second UCI to a base station.

The processing unit 902 is further configured to:
perform CCA or LBT on the first cell.

The sending unit 903 is specifically configured to:
if it is detected that the first cell is not idle, transmit the UCI on the PUCCH resource; or if it is detected that the first cell is idle, transmit the UCI on the PUSCH resource of the first cell.

In this way, the user equipment pre-configures the first UCI and the second UCI, adds the first UCI to the physical uplink shared channel PUSCH resource of the first cell for transmission, adds the second UCI to the physical uplink control channel PUCCH resource for transmission, and sends the first UCI or the second UCI to the base station, to effectively ensure that when the user equipment has both a PUCCH resource and a PUSCH resource, the UCI can be transmitted to the base station.

In an implementation, when the user equipment has both a physical uplink control channel PUCCH resource and a physical uplink shared channel PUSCH resource in a current subframe, the sending unit 903 is configured to transmit uplink control information UCI based on a cell type of a cell in which the PUSCH resource is located, where the cell type of the cell in which the PUSCH resource is located includes a first cell and a second cell, or the cell type of the cell in which the PUSCH resource is located includes only a first cell, the first cell is a cell on which clear channel assessment CCA or listen before talk LBT detection needs to be performed, and the second cell is a cell on which CCA or LBT detection does not need to be performed.

The receiving unit 901 is configured to receive first configuration information sent by a base station, where the first configuration information includes a cell index of the first cell and a cell index of the second cell, and the cell index of the first cell is greater than the cell index of the second cell; or the first configuration information includes only a cell index of the first cell.

The sending unit 903 is specifically configured to:
when the cell type of the cell in which the PUSCH resource is located includes a first cell and at least one second cell, transmit the UCI after the UCI is added to a PUSCH resource of a second cell with a minimum cell index.

The sending unit 903 is specifically configured to:
when the cell type of the cell in which the PUSCH resource is located includes only a first cell, skip sending the UCI, or transmit the UCI on the PUCCH resource.

In this way, the user equipment has both a PUSCH resource of the first cell and a PUSCH resource of the second cell, and the user equipment may transmit the UCI based on the cell type of the cell in which the PUSCH resource is located, to effectively ensure that when the user equipment has both the PUCCH resource and the PUSCH resource, the UCI can be transmitted to the base station and the base station receives the UCI.

In an implementation, when the user equipment has both a physical uplink control channel PUCCH resource and a physical uplink shared channel PUSCH resource in a subframe K, the processing unit 902 is configured to add UCI to a PUSCH resource of a first cell in at least one subframe after the subframe K, where the first cell is a cell on which clear channel assessment CCA or listen before talk LBT detection needs to be performed.

The sending unit 903 is configured to transmit the UCI on the PUSCH resource.

A cell type of a cell in which the PUCCH resource is located includes a first cell or a second cell, the second cell is a cell on which clear channel assessment CCA or listen before talk LBT detection does not need to be performed, and when the cell type of the cell in which the PUCCH resource is located is a first cell, duration occupied by the PUCCH resource is less than or equal to duration of a subframe.

When a cell type of a cell in which the PUCCH resource is located is a first cell, the PUCCH includes a PUCCH that is distributed over an entire bandwidth or most contiguous or non-contiguous bandwidths, and the processing unit 902 is specifically configured to:

add the UCI to the PUSCH resource of the first cell based on a cell index of the first cell.

The processing unit 902 is further configured to:

perform CCA or LBT on the first cell.

The sending unit 903 is specifically configured to:

if it is detected that the first cell is idle, transmit the UCI on the PUSCH resource in the at least one subframe after the subframe K.

The processing unit 902 is further configured to:

if it is detected that the first cell is not idle, continue to perform CCA or LBT on the first cell.

The sending unit 903 is further configured to:

if the user equipment detects that the first cell is idle, transmit the UCI on a PUSCH resource in at least one subframe after a subframe K+1.

In this way, after adding the UCI to the PUSCH resource of the first cell, the user equipment transmits the UCI on the PUSCH resource in the at least one subframe after the subframe K, to effectively ensure that when the user equipment has both the PUCCH resource and the PUSCH resource, the UCI can be transmitted to a base station and the base station receives the UCI.

In an implementation, when the user equipment simultaneously transmits a physical uplink control channel PUCCH and a physical uplink shared channel PUSCH in a subframe K, the receiving unit 901 is configured to receive first configuration information sent by a base station, where the first configuration information includes: physical uplink control channel PUCCH resource location information and at least one of a PUCCH timer Timer, a transmission opportunity TXOP, uplink resource duration allocated by the base station, and a PUCCH location at which channel state information CSI is located, and the PUCCH resource location information includes at least two candidate locations of a PUCCH resource.

The processing unit 902 is configured to perform listen before talk LBT based on the first configuration information, to obtain an LBT result.

The processing unit 902 is further configured to determine a location of the PUCCH resource in a subframe based on the LBT result.

In this way, the user equipment performs LBT by using the first configuration information, and determines a location of the PUCCH resource in a subframe based on the LBT result, to effectively ensure that when the user equipment has both a PUCCH resource and a PUSCH resource, the UCI can be transmitted to the base station as soon as possible and the base station receives the UCI.

In this embodiment, the user equipment 90 is presented in a form of a functional unit. The "unit" herein may be an application-specific integrated circuit (English full name: application-specific integrated circuit, ASIC for short), a circuit, a processor configured to execute one or more software or firmware programs, and a memory, an integrated logic circuit, and/or another device that can provide the foregoing functions. In a simple embodiment, a person skilled in the art may figure out that the user equipment 90 may be in a form shown in FIG. 21. The receiving unit 901, the processing unit 902, and the sending unit 903 may be implemented by the computer device in FIG. 4. Specifically, receiving unit 901 and the sending unit 903 may be implemented by the communications interface 104, and the processing unit 902 may be implemented by the processor 101.

An embodiment of the present invention further provides a computer storage medium, configured to store a computer software instruction used by the user equipment shown in FIG. 21, and the computer software instruction includes a program designed to perform the foregoing method embodiments. UCI can be transmitted by executing the stored program.

As described in the present invention, the cell type of the cell in which the PUCCH resource is located includes a first cell and a second cell. When the cell type of the cell in which the PUCCH resource is located is a first cell, duration occupied by the PUCCH resource is less than or equal to duration of a subframe.

If the UCI described in any embodiment of the present invention is CSI, the CSI may be obtained by performing measurement in a same subframe, or may be obtained by performing measurement in different subframes.

The terms "first" and "second" described in the specific embodiments of the present invention are only used to distinguish between different cells, and there is no time sequence.

It may be clearly understood by a person skilled in the art that, for the purpose of convenient and brief description, for a detailed working process of the foregoing apparatus and unit, refer to a corresponding process in the foregoing method embodiments, and details are not described herein again.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art should understand that all or some of the steps of the method embodiments may be implemented by a program instructing relevant hardware. The program may be stored in a computer readable storage medium. When the program is executed, the steps of the method embodiments are performed. The storage medium includes: any medium that can store program code, such as a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An uplink control information transmission method, comprising:
   pre-configuring, by user equipment having a physical uplink shared channel (PUSCH) resource transmission and a physical uplink control channel (PUCCH) resource transmission:
      a first uplink control information (UCI), wherein the first UCI is to be carried on the PUSCH resource; and
      a second UCI, wherein the second UCI is to be carried on the PUCCH resource;
   adding, by the user equipment, the first UCI to the PUSCH resource of a first cell for transmission, wherein the first cell is a cell on which clear channel assessment (CCA) or listen before talk (LBT) detection is to be performed;
   adding, by the user equipment, the second UCI to the PUCCH resource for transmission, wherein the PUSCH resource and the PUCCH resource are in a same subframe; and
   sending, by the user equipment, at least one of the first UCI or the second UCI to a base station.

2. The method according to claim 1, wherein before the sending, by the user equipment, at least one of the first UCI or the second UCI to a base station, the method further comprises:
   performing, by the user equipment, CCA or LBT on the first cell.

3. The method according to claim 2, wherein the sending, by the user equipment, at least one of the first UCI or the second UCI to a base station comprises:
   if it is detected that the first cell is not idle, transmitting, by the user equipment, the second UCI on the PUCCH resource; or
   if it is detected that the first cell is idle, transmitting, by the user equipment, the first UCI on the PUSCH resource of the first cell.

4. User equipment, comprising:
   a physical uplink shared channel (PUSCH) resource;
   a physical uplink control channel (PUCCH) resource, wherein the PUSCH resource and the PUCCH resource are in the same subframe;
   a processor, configured to:
      pre-configure a first uplink control information (UCI) to be carried on the PUSCH resource;
      pre-configure a second UCI to be carried on the PUCCH resource;
      add the first UCI to the PUSCH resource of a first cell for transmission; and
      add the second UCI to the PUCCH resource for transmission of a second cell for transmission,
      wherein the first cell is a cell on which clear channel assessment CCA) or listen before talk (LBT) detection to be performed; and
   a transmitter, configured to send at least one of the first UCI or the second UCI to a base station.

5. The user equipment according to claim 4, wherein the processor is further configured to:
   perform CCA or LBT on the first cell.

6. The user equipment according to claim 5, wherein the transmitter is further configured to:
   if it is detected that the first cell is not idle, transmit the second UCI on the PUCCH resource; or
   if it is detected that the first cell is idle, transmit the first UCI on the PUSCH resource of the first cell.

7. The method according to claim 1, wherein the first UCI includes channel state information (CSI), hybrid automatic repeat request (HARQ), feedback information, and a scheduling request (SR).

8. The method according to claim 1, wherein the PUSCH resource and the PUCCH resource are in a current subframe and wherein sending, by the user equipment, at least one of the first UCI or the second UCI to a base station comprises:
   transmitting, by the user equipment, at least one of first UCI or the second UCI, based on a cell type of a cell in which the PUSCH resource is located.

9. The method according to claim 8, wherein the cell type of the cell in which the PUSCH resource is located includes a first cell and a second cell, wherein:
   the first cell is a cell on which CCA or LBT detection to be performed; and
   the second cell is a cell on which CCA and LBT detection is to be performed.

10. The method according to claim 1, wherein sending, by the user equipment, at least one of the first UCI or the second UCI to a base station comprises:
    multiplexing, by the user equipment, the second UCI, which is to be carried on the PUCCH resource, on a PUSCH data resource for transmission.

11. The user equipment according to claim 4, wherein the first UCI includes channel state information CSI, hybrid automatic repeat request HARQ, feedback information, and a scheduling request SR.

12. The user equipment according to claim 4, wherein the PUSCH resource and the PUCCH resource are in a current subframe and wherein the transmitter is configured to send at least one of the first UCI or the second UCI to the base station based on a cell type of a cell in which the PUSCH resource is located.

13. The user equipment according to claim 12, wherein the cell type of the cell in which the PUSCH resource is located includes a first cell and a second cell, wherein:
    the first cell is a cell on which CCA or LBT detection is to be performed; and
    the second cell is a cell on which CCA and LBT detection is not to be performed.

14. The user equipment according to claim 4, wherein the user equipment multiplexes the second UCI, which is to be carried on the PUCCH resource, on a PUSCH data resource for transmission.

15. User equipment, comprising
    a physical uplink shared channel (PUSCH) resource;
    a physical uplink control channel (PUCCH) resource, wherein the PUSCH resource and the PUCCH resource are in the same subframe;
    a processor; and
    a non-transitory computer-readable storage medium, wherein the non-transitory computer-readable storage medium is coupled to the processor and comprises programming instructions for execution by the processor, wherein the programming instructions, when executed by the processor, cause the user equipment to:
    pre-configure:
       a first uplink control information (UCI), wherein the first UCI is to be carried on the PUSCH resource; and
       a second UCI, wherein the second UCI is to be carried on the PUCCH resource;
    add the first UCI to the PUSCH resource of a first cell for transmission, wherein the first cell is a cell on which clear channel assessment (CCA) or listen before talk (LBT) detection is to be performed;

add the second UCI to the-PUCCH resource for transmission, wherein the PUSCH resource and the PUCCH resource are in the same subframe; and send at least one of the first UCI or the second UCI to a base station.

16. The user equipment according to claim 15, wherein the programming instructions, when executed by the processor, further cause the user equipment to:

if it is detected that the first cell is not idle, transmit the second UCI on the PUCCH resource; or if it is detected that the first cell is idle, transmit the first UCI on the PUSCH resource of the first cell.

17. The user equipment according to claim 15, wherein the first UCI includes channel state information CSI, hybrid automatic repeat request HARQ, feedback information, and a scheduling request SR.

18. The user equipment according to claim 15, wherein the PUSCH resource and the PUCCH resource are in a current subframe and wherein the programming instructions, when executed by the processor, further cause the user equipment to:

send at least one of the first UCI or the second UCI to the base station based on a cell type of a cell in which the PUSCH resource is located.

19. The user equipment according to claim 18, wherein the cell type of the cell in which the PUSCH resource is located includes a first cell and a second cell, wherein:

the first cell is a cell on which CCA or LBT detection is to be performed; and the second cell is a cell on which CCA and LBT detection is not to be performed.

20. The user equipment according to claim 15, wherein the programming instructions, when executed by the processor, further cause the user equipment to:

multiplex the second UCI, which is to be carried on the PUCCH resource, on a PUSCH data resource for transmission.

* * * * *